US008265712B2

(12) United States Patent
Pernu et al.

(10) Patent No.: US 8,265,712 B2
(45) Date of Patent: Sep. 11, 2012

(54) MULTIRADIO POWER AWARE TRAFFIC MANAGEMENT

(75) Inventors: Ville Pernu, Tampere (FI); Jussi Ylänen, Lempäälä (FI); Jani Okker, Tampere (FI); Jukka Reunämaki, Tampere (FI); Arto Palin, Viiala (FI)

(73) Assignee: Nokia Corporation, Espoo (FI)

( * ) Notice: Subject to any disclaimer, the term of this patent is extended or adjusted under 35 U.S.C. 154(b) by 1087 days.

(21) Appl. No.: 11/735,077

(22) Filed: Apr. 13, 2007

(65) Prior Publication Data
US 2008/0253351 A1 Oct. 16, 2008

(51) Int. Cl.
H04M 1/00 (2006.01)
(52) U.S. Cl. ............... 455/574; 455/41.2; 455/343.5; 455/63.1; 455/557; 370/311; 370/345; 370/347; 370/328
(58) Field of Classification Search ............... 370/332, 370/345, 331, 311, 347; 455/41.2, 41.3, 455/343.2–343.6, 552.1, 553.1, 574, 343.5, 455/63.1, 557
See application file for complete search history.

(56) References Cited

U.S. PATENT DOCUMENTS

| 6,456,605 | B1 * | 9/2002 | Laakso et al. ............... 370/330 |
| 6,574,456 | B2 * | 6/2003 | Hamabe ...................... 455/63.3 |
| 6,873,825 | B2 * | 3/2005 | Pattabiraman ............... 455/41.2 |
| 6,944,147 | B2 * | 9/2005 | Chheda ........................ 370/342 |
| 6,985,700 | B1 * | 1/2006 | Laakso et al. ............... 455/63.1 |
| 7,062,302 | B2 * | 6/2006 | Yamaoka ..................... 455/574 |
| 7,626,973 | B2 * | 12/2009 | Palin et al. .................... 370/347 |
| 7,787,901 | B2 * | 8/2010 | Bennett ......................... 455/522 |
| 7,809,012 | B2 * | 10/2010 | Ruuska et al. ................ 370/449 |
| 8,060,041 | B2 * | 11/2011 | Ballantyne ................... 455/133 |
| 8,064,374 | B2 * | 11/2011 | Kakani et al. ................. 370/311 |
| 8,107,880 | B2 * | 1/2012 | Okker et al. ................. 455/41.2 |
| 2003/0185214 | A1 * | 10/2003 | Yang et al. ................. 370/395.4 |
| 2004/0029621 | A1 * | 2/2004 | Karaoguz et al. ............ 455/574 |
| 2006/0013235 | A1 | 1/2006 | Farnham |
| 2010/0271994 | A1 * | 10/2010 | Wolfe .......................... 370/311 |
| 2011/0021153 | A1 * | 1/2011 | Safavi ......................... 455/63.1 |

FOREIGN PATENT DOCUMENTS

| EP | 0917321 | 5/1999 |
| EP | 1 365 312 A1 | 11/2003 |
| WO | WO9603813 | 2/1996 |
| WO | WO0223824 | 3/2002 |
| WO | 2005060287 A1 | 6/2005 |

OTHER PUBLICATIONS

"PCT Notification of Transmittal of the International Search Report and the Written Opinion of the International Searching Authority, or the Declaration"; Jul. 17, 2008; 10 pp.; EPO.

* cited by examiner

Primary Examiner — Sharad Rampuria
(74) Attorney, Agent, or Firm — Locke Lord LLP

(57) ABSTRACT

A system for managing the operation of a plurality of radio modules integrated within the same wireless communication device. In at least one embodiment of the present invention, time may be allocated for use in communicating over one or more wireless communication mediums. This time may be allocated based on a determination that a maximum power usage threshold will not be exceeded, and that potential communication conflicts may be avoided, over a period of time. The allocation may result in an operational schedule that may be utilized by radio modules in the wireless communication device that support the one or more wireless communication mediums.

35 Claims, 20 Drawing Sheets

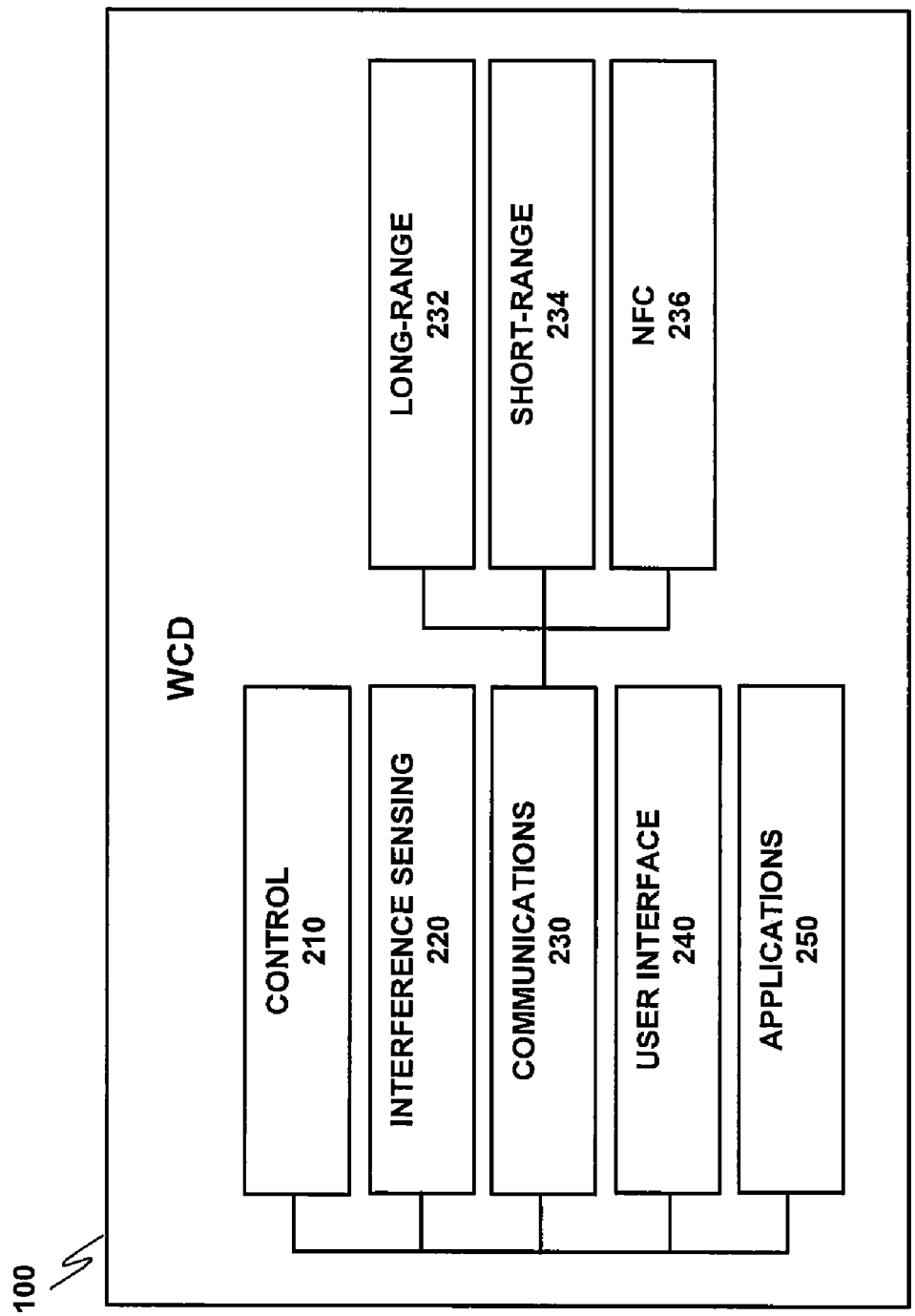

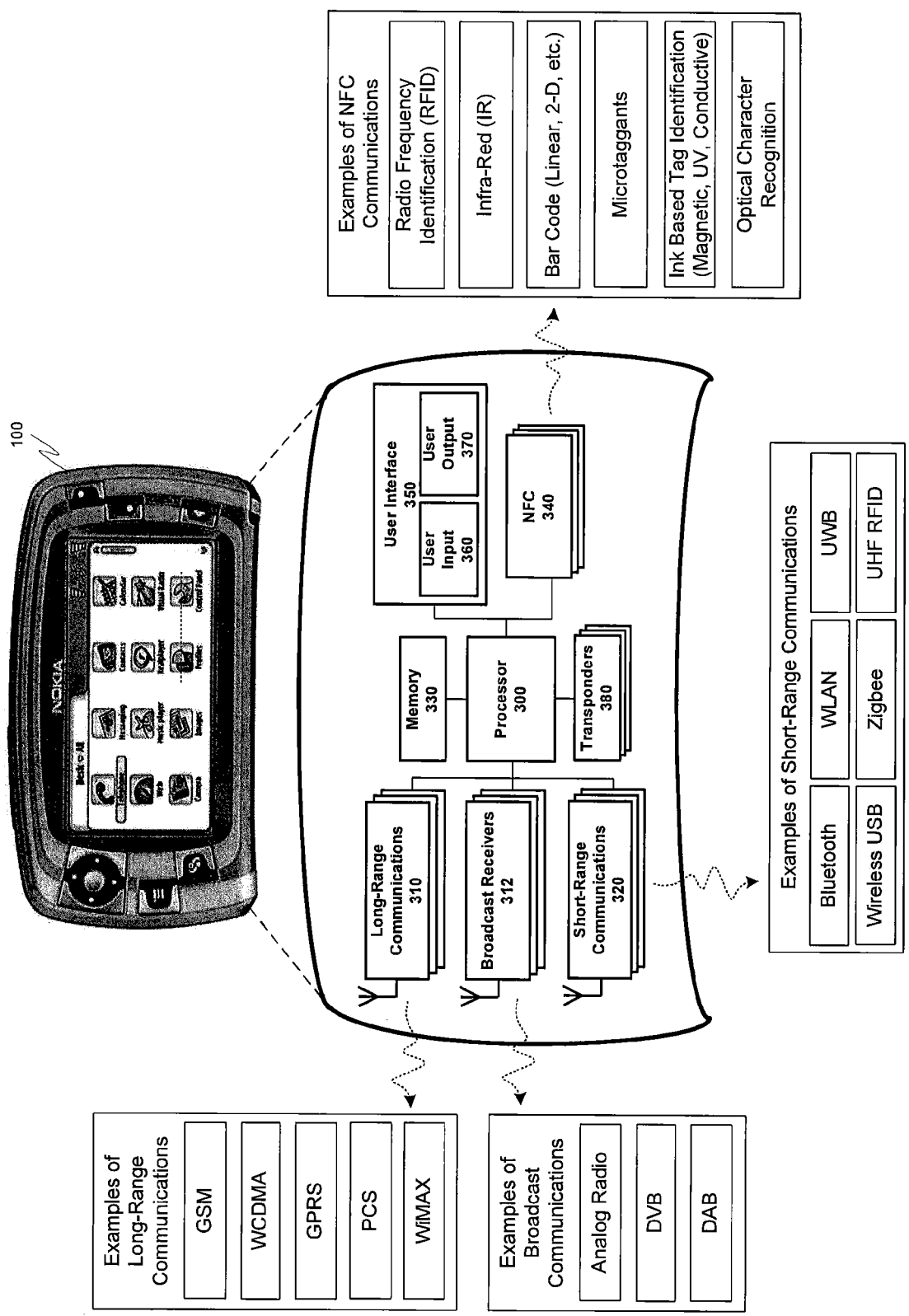

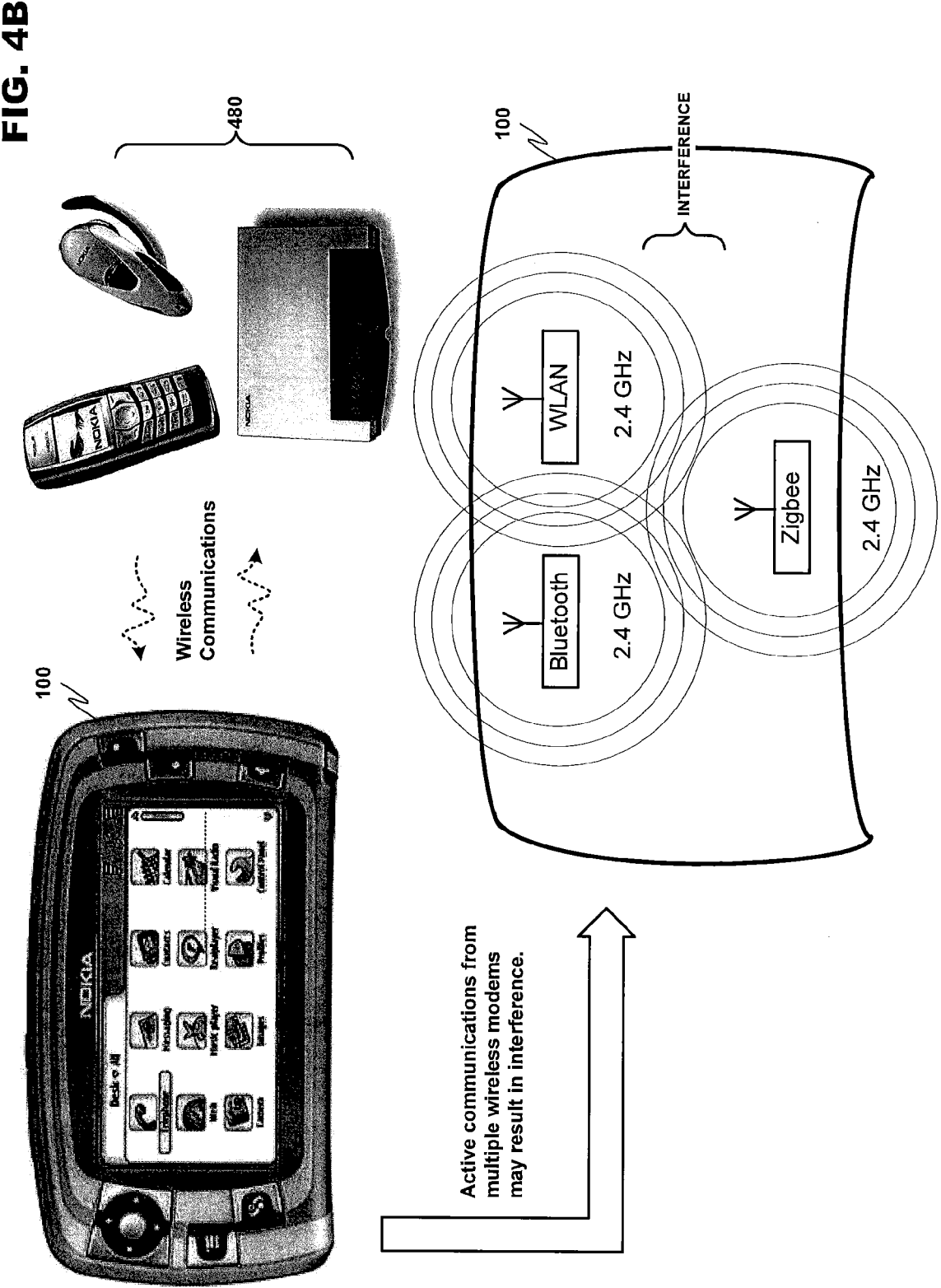

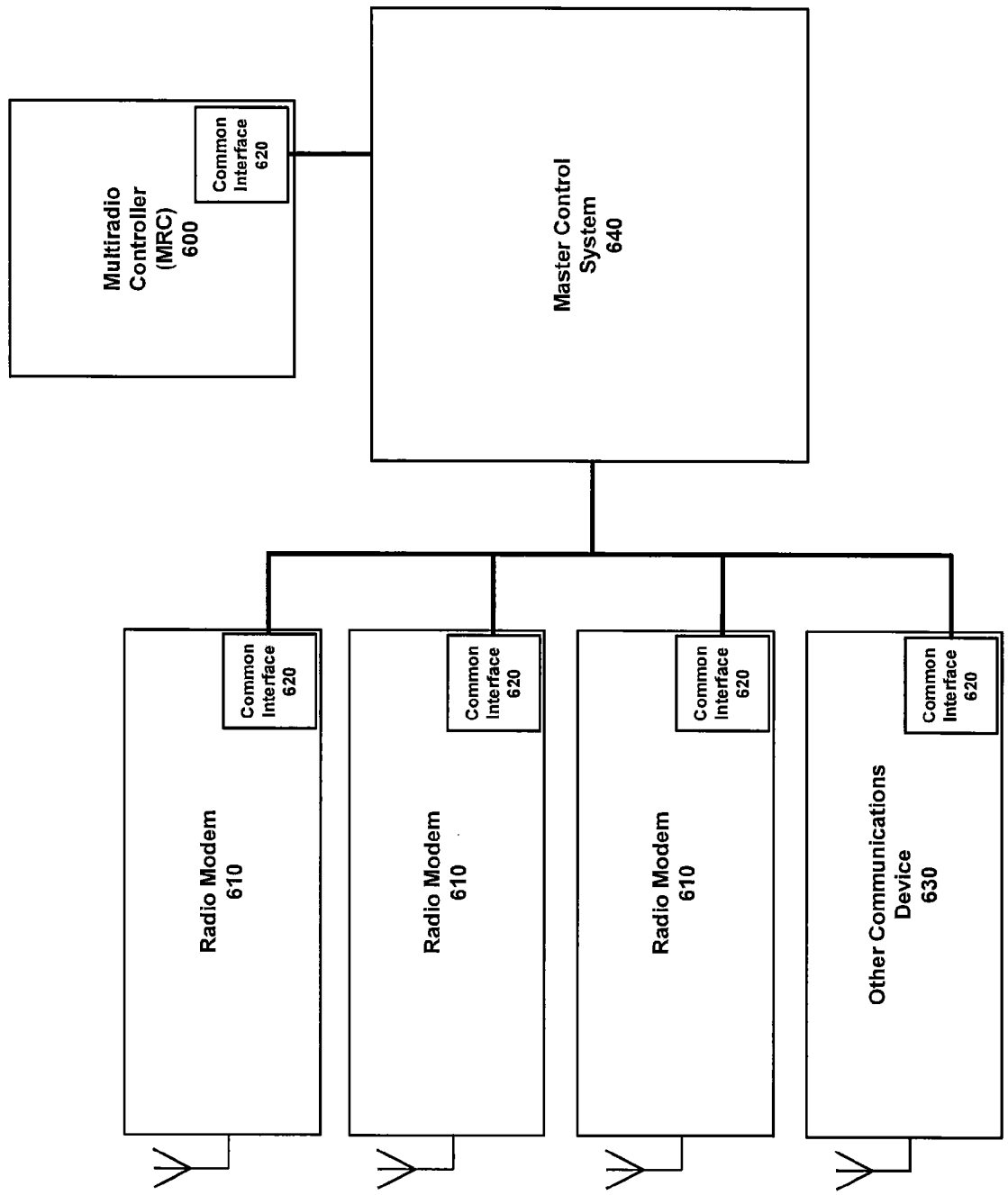

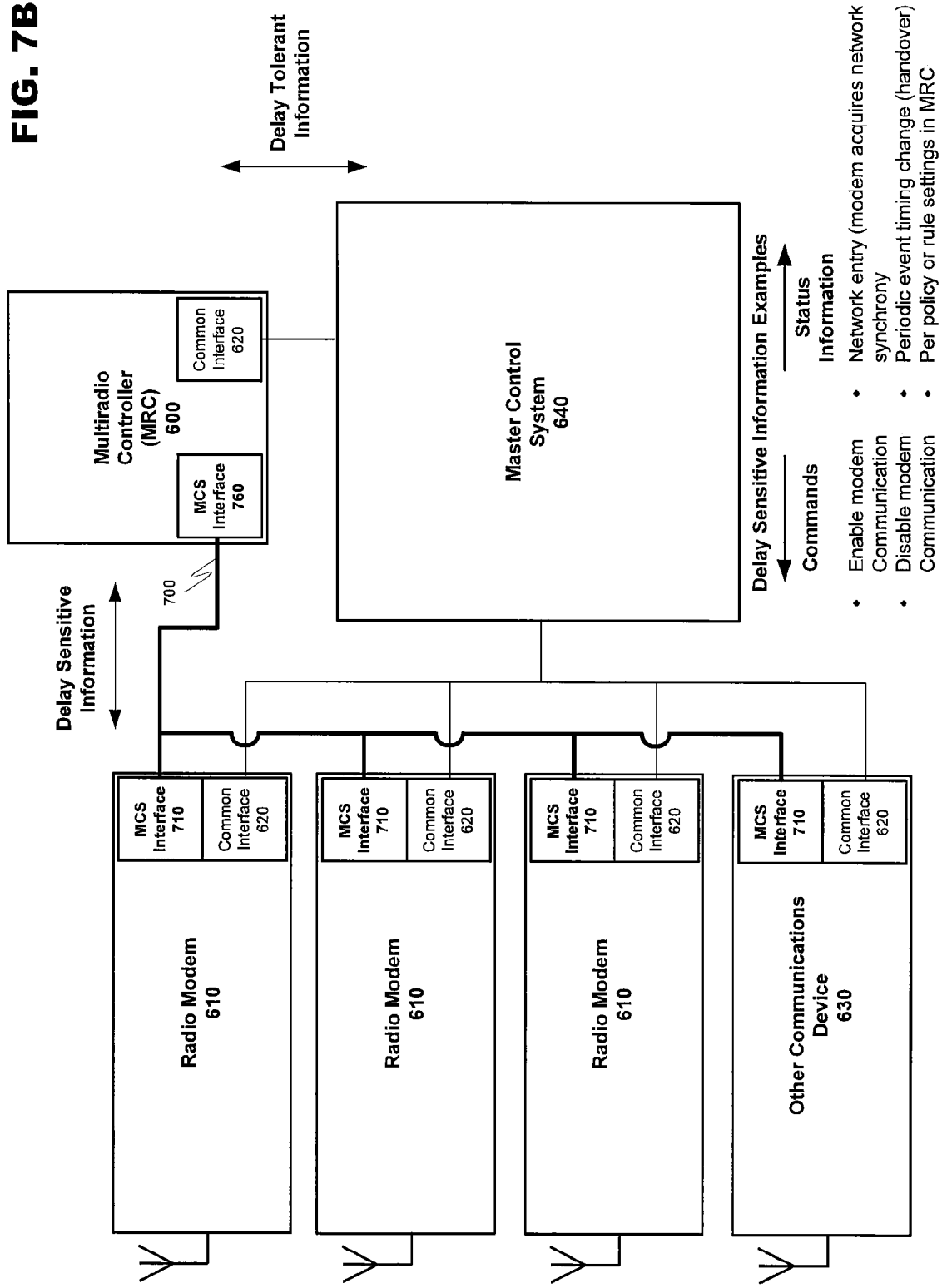

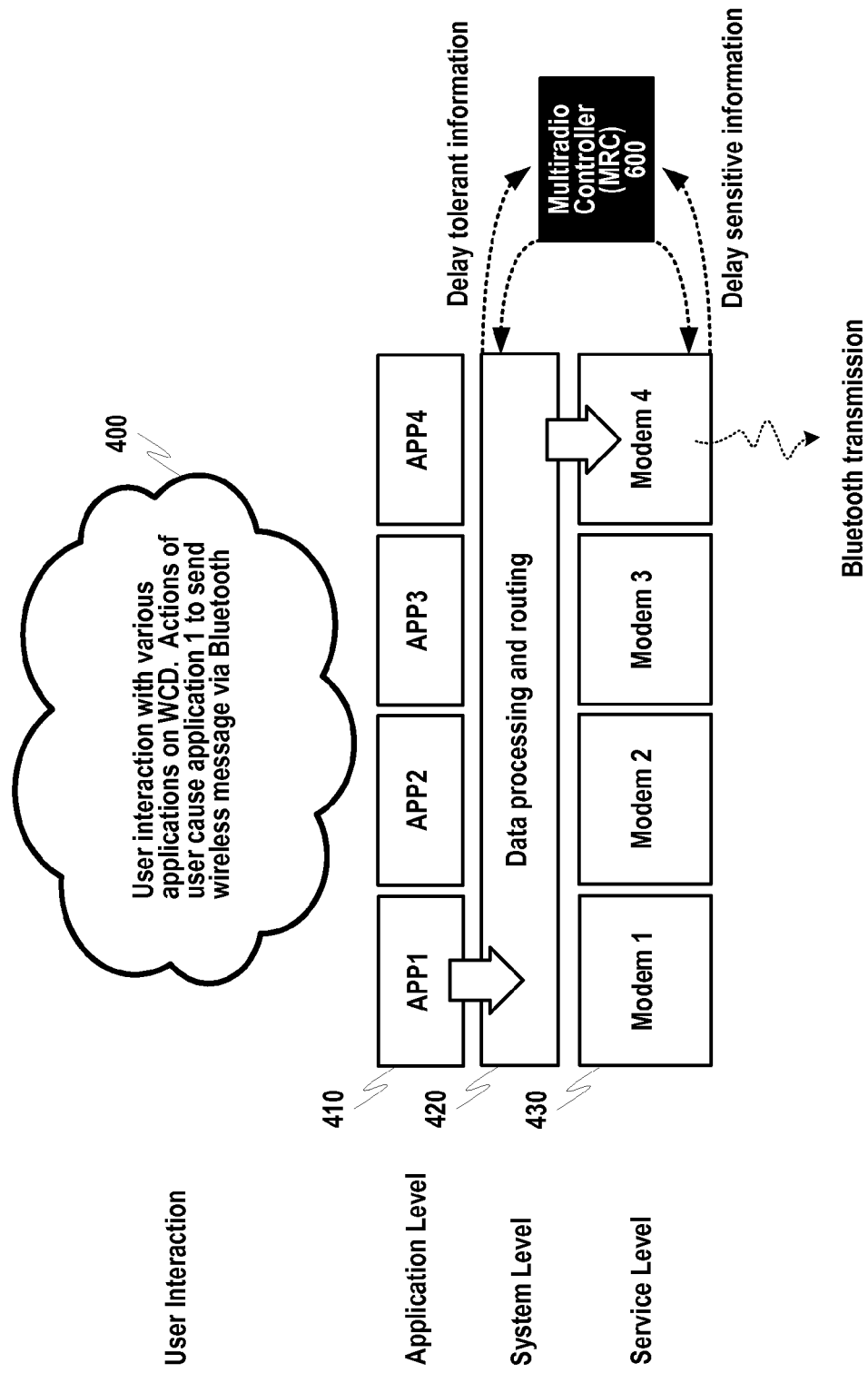

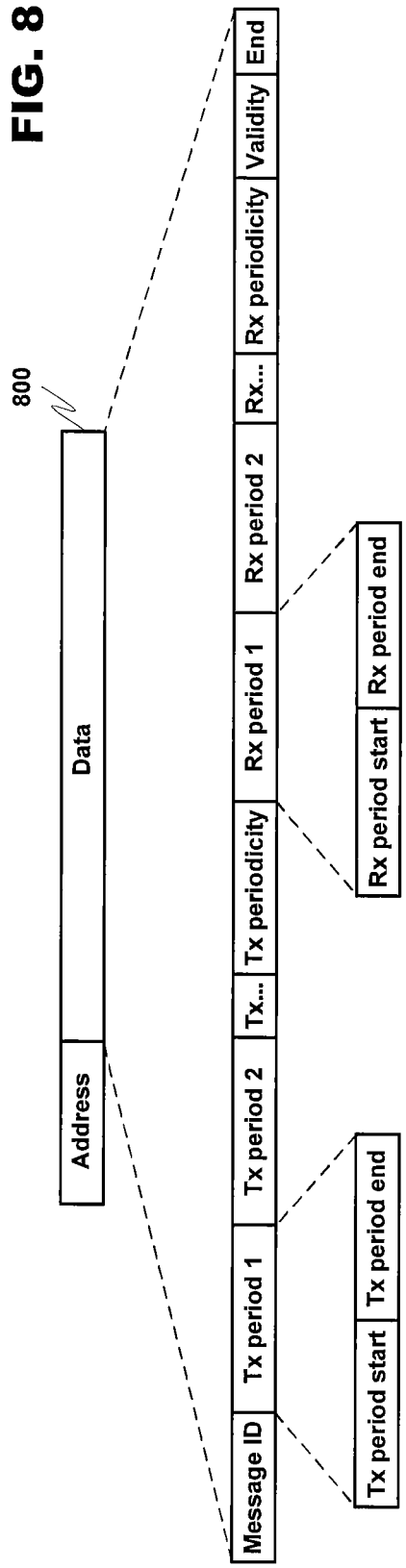

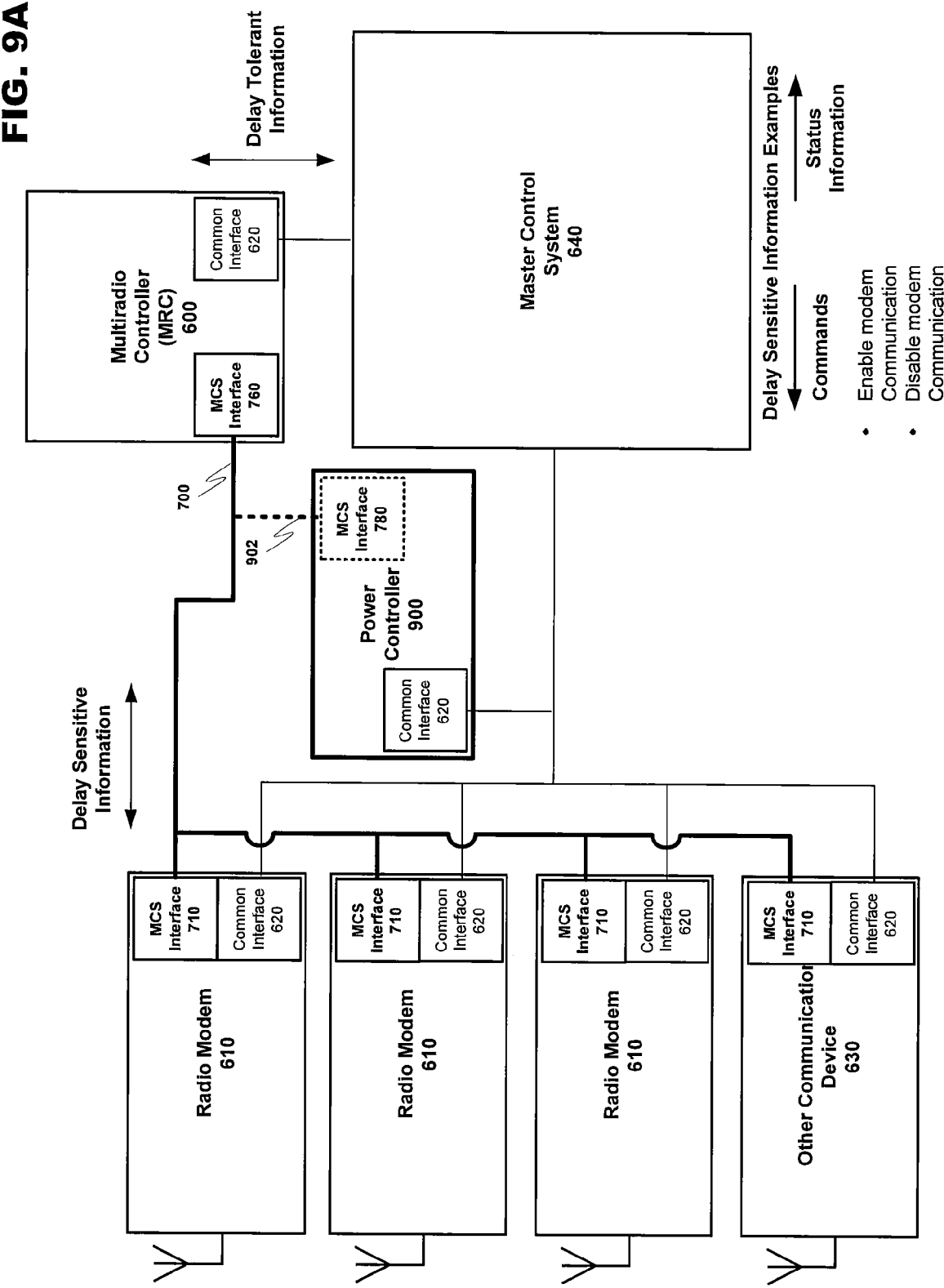

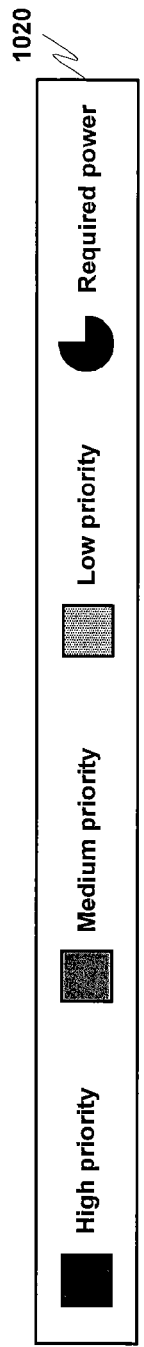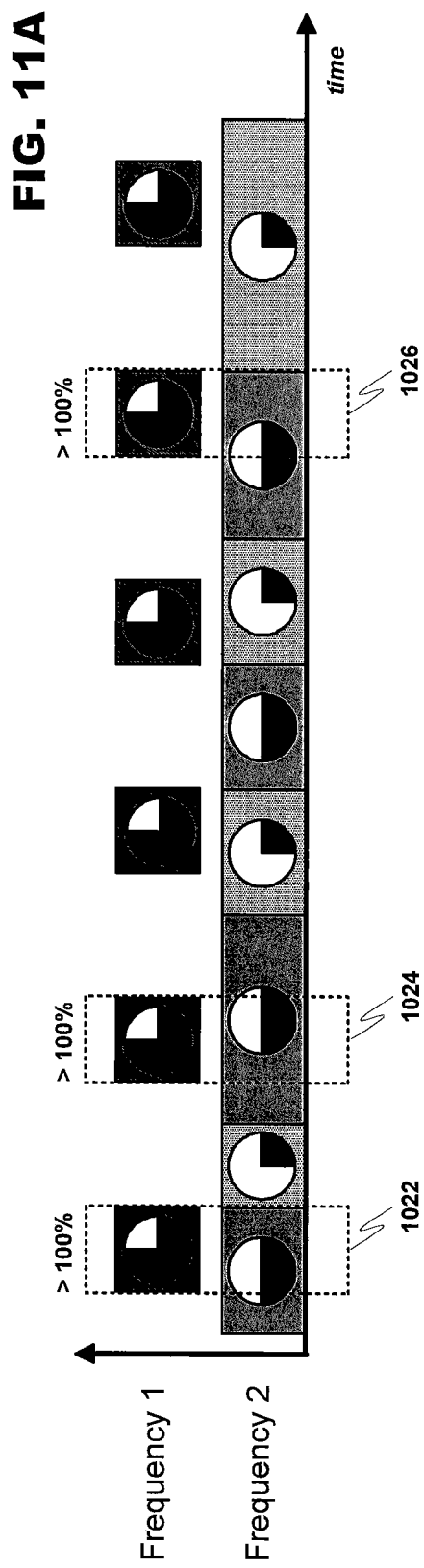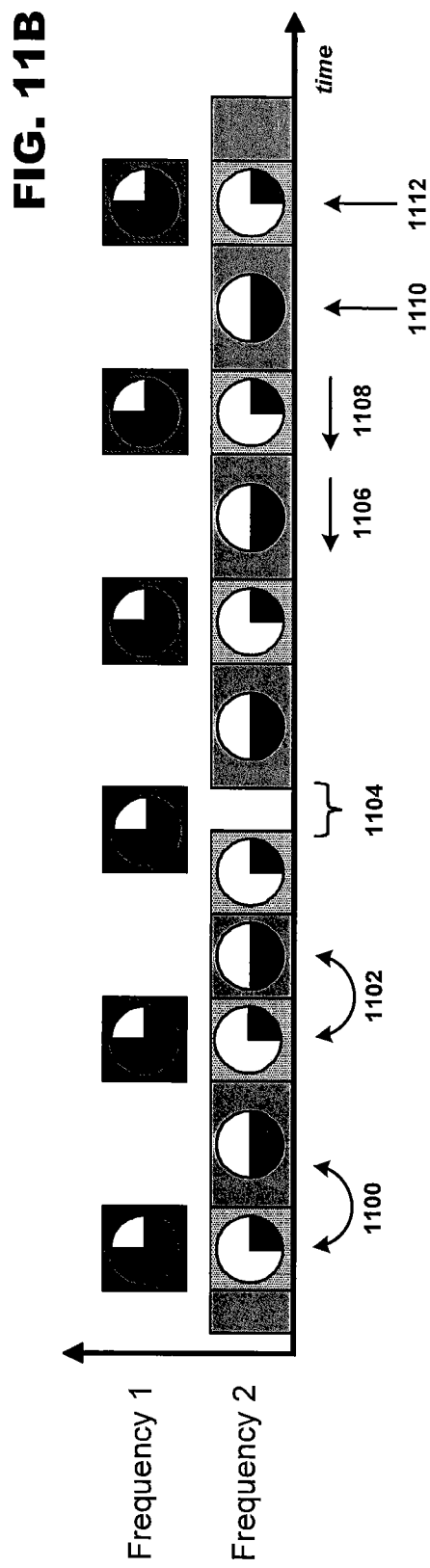
FIG. 11A
FIG. 11B

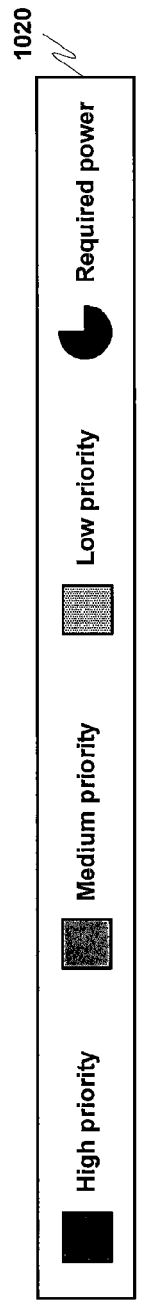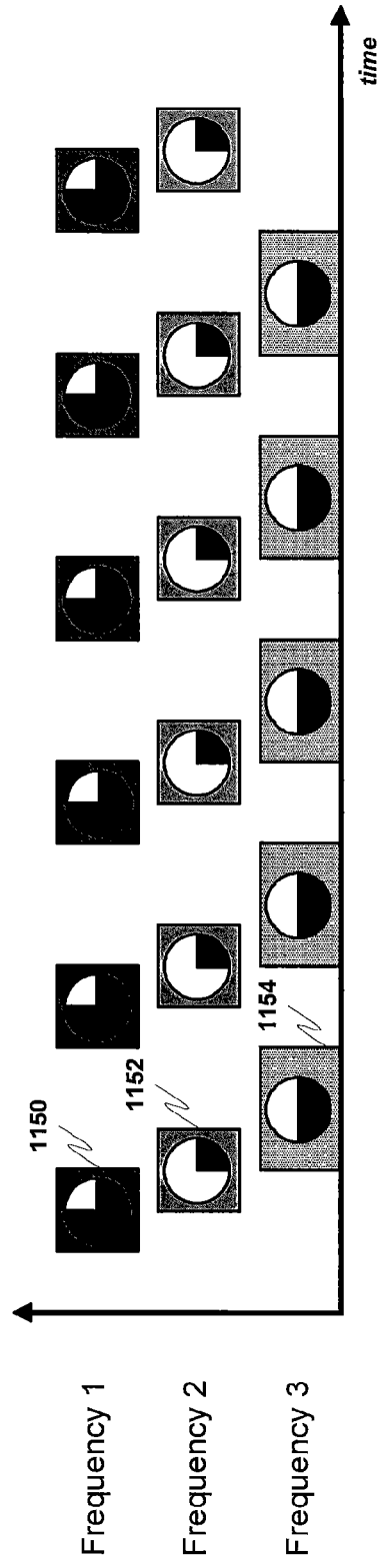
FIG. 11C
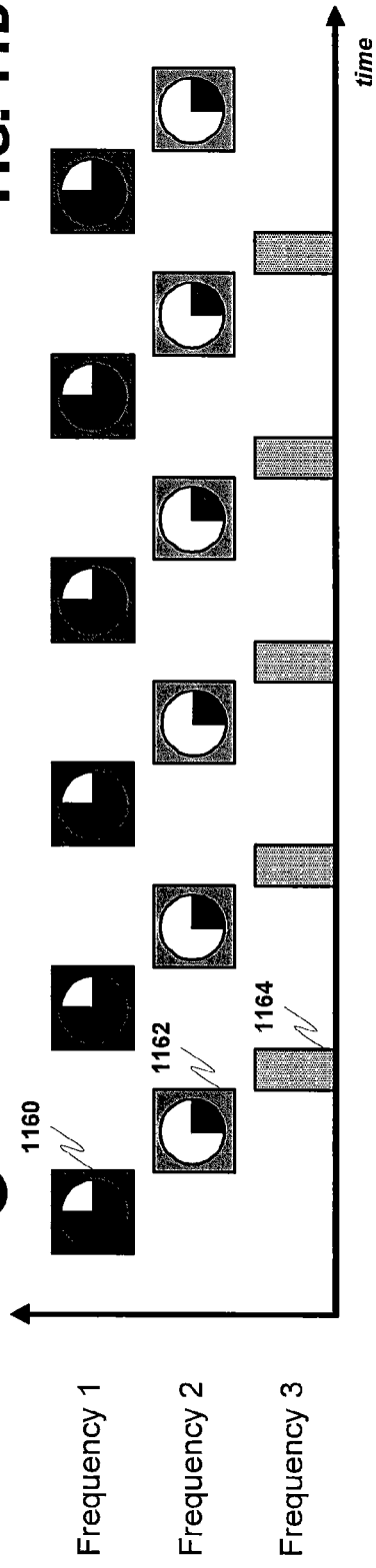
FIG. 11D

MULTIRADIO POWER AWARE TRAFFIC MANAGEMENT

BACKGROUND OF INVENTION

1. Field of Invention

The present invention relates to a system for managing radio modules integrated within a wireless communication device, and more specifically, to a multiradio control system enabled to create an operational schedule for at least one wireless communication medium supported by at least one radio module so as not to exceed an allowed power usage threshold.

2. Description of Prior Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communication, to modern digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A 1 Mbps Bluetooth™ radio may transmit and receives data at a rate of 720 Kbps within a range of 10 meters, and may transmit up to 100 meters with additional power boosting. Enhanced data rate (EDR) technology also available may enable maximum asymmetric data rates of 1448 Kbps for a 2 Mbps connection and 2178 Kbps for a 3 Mbps connection. A user does not actively instigate a Bluetooth™ network. Instead, a plurality of devices within operating range of each other may automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master. These devices continually switch between various active communication and power saving modes in order to transmit data to other piconet members. In addition to Bluetooth™ other popular short-range wireless network technologies include WLAN (of which "Wi-Fi" local access points communicating in accordance with the IEEE 802.11 standard, is an example), Wireless USB (WUSB), Ultra Wideband (UWB), ZigBee (802.15.4, 802.15.4a), and UHF RFID. All of these wireless communication technologies have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Near Field communication (NFC) technologies include machine-readable mediums such as radio frequency identification (RFID), Infra-red (IR) communication, optical character recognition (OCR) and various other types of visual, electronic and magnetic scanning are used to quickly input desired information into the WCD without the need for manual entry by a user.

Device manufacturers are continuing to incorporate as many of the previously indicated exemplary communication features as possible into wireless communication devices in an attempt to bring powerful, "do-all" devices to market. Devices incorporating long-range, short-range and machine readable communication resources also often include multiple wireless mediums or radio protocols for each category. A multitude of wireless media options may assist a WCD in quickly adjusting to its environment, for example, communicating both with a WLAN access point and a Bluetooth™ peripheral device, possibly (and probably) at the same time.

Given the large array communication features that may be compiled into a single device, it is foreseeable that a user will need to employ a WCD to its full potential when replacing other productivity related devices. For example, a user may use a multifunction WCD to replace traditional tools such as individual phones, facsimile machines, computers, storage media, etc. which tend to be more cumbersome to both integrate and transport. In at least one use scenario, a WCD may be communicating simultaneously over numerous different wireless mediums. A user may utilize multiple peripheral Bluetooth™ devices (e.g., a headset and a keyboard) while having a voice conversation over GSM and interacting with a WLAN access point in order to access the Internet. Problems may occur when these concurrent transactions cause interference with each other. Even if a communication medium does not have an identical operating frequency as another medium, a radio modem may cause extraneous interference to another medium. Further, it is possible for the combined effects of two or more simultaneously operating radios to create intermodulation effects to another bandwidth due to harmonic effects. These disturbances may cause errors resulting in the required retransmission of lost packets, and the overall degradation of performance for one or more communication mediums.

While a WCD may engage in wireless communication with a multitude of other devices concurrently, in some instances resource constraints may arise, for example, when two or more of the peripheral devices are communicating using different radio protocols. In at least one example scenario, multiple subsystems within a WCD may operate in a substantially concurrent manner. Aside from the previously indicated communication resources, these subsystems may include, for example, at least the operating system of the device as well as operator interface elements (e.g., audio, video, inputs, alarming components, etc.). The relatively simultaneous operation of these subsystems may induce a strain on the power source of a portable WCD. As a result, a persistent development limitation restricting the number of features that can be included in a WCD may exist in view of the ability to reliably supply power (e.g., battery technology).

Technology is now emerging to enable a WCD to schedule communications amongst a plurality of modems integrated within the same device, however, this control strategy may not necessarily address power conservation concerns. In actuality, the ability to operate one or more radio modules supporting one or more wireless communication mediums in a relatively simultaneous manner without communication failures due to interference, collisions, etc. may in turn worsen the rate of power consumption and other operational problems. Initially, the ability to operate everything all at once may exceed the specifications of a battery, possibly damaging the battery and maybe even the device. In addition, a WCD may also be impacted by high temperature. Increased power consumption due to multitasking may cause components within the device to overheat. In emerging small form-factor devices, the compact layout does not allow for substantial temperature management resources (e.g., heat sinks or fans), and as a result, the device may automatically reboot or shut down, or may even become damaged from the heat.

What is therefore needed is a system for managing wireless resources in the same device that utilize potentially conflicting wireless communication mediums that is also enabled to account for power limitations. The system should be able to manage the operation of wireless communication mediums so as to avoid conflicts, while also managing the instantaneous power requirements in view of the available power. The system should further be able to adjust to real time power levels by reorganizing power utilization requirements, for example by priority, in order to ensure that both communication failures will be avoided and the power will be reliable.

SUMMARY OF INVENTION

The present invention includes at least a method, computer program, device and system for managing the operation of a plurality of radio modules integrated within the same WCD. In at least one embodiment of the present invention, time may be allocated for use in communicating over one or more wireless communication mediums. The allocated time may take the form of timeslots. The allocation of these timeslots to at least one wireless communication medium may be based on both avoiding communication conflicts and operating within power constraints based on, for example, the current power level of a battery.

The present invention, in at least one embodiment, may be implemented in a WCD including at least a multiradio controller, power management controller and one or more radio modules. The multiradio controller and/or power management controller may be coupled to at least the one or more radio modules in order to manage wireless communication for the WCD. This coupling may further include a communication bus dedicated to conveying delay-sensitive information between components in the WCD. The multiradio controller may receive information related to communication activity in the WCD, status information from the one or more radio modules and power usage information from various WCD subsystems. The received information may then be utilized to formulate operational schedules for each wireless communication medium. These operational schedules may be distributed to each radio module, wherein local control resources may utilize the operational schedules in order to control message reception and transmission for the one or more wireless communication mediums.

In a further example of the present invention, the time in the operational schedule may be divided into timeslots during which a wireless communication medium is permitted to operate. The determination of the activities that may occur during a particular timeslot may be based on both the management of power consumption in the WCD and the avoidance of any potential communication conflicts between the various wireless communication mediums. In at least one scenario, a determination of priority between the various energy consumers may be utilized to determine the resources that will be permitted to operate in a specific timeslot. This determination of priority and power usage may result in the reorganization of an operational schedule, or may further specify operation for a timeslot where multiple wireless communication mediums are permitted to communicate, but only in a specific configuration (e.g., one at a time).

DESCRIPTION OF DRAWINGS

The invention will be further understood from the following detailed description of a preferred embodiment, taken in conjunction with appended drawings, in which:

FIG. 2 discloses a modular description of an exemplary wireless communication device usable with at least one embodiment of the present invention.

FIG. 3 discloses an exemplary structural description of the wireless communication device previously described in FIG. 2.

FIG. 4B discloses an operational example wherein interference occurs when utilizing multiple radio modems simultaneously within the same wireless communication device.

FIG. 6B discloses a more detailed structural diagram of FIG. 6A including the multiradio controller and the radio modems.

FIG. 7B discloses a more detailed structural diagram of FIG. 7A including the multiradio control system and the radio modems.

FIG. 7C discloses an exemplary operational description of a wireless communication device including a multiradio control system in accordance with at least one embodiment of the present invention.

FIG. 8 discloses an exemplary information packet usable with at least one embodiment of the present invention.

FIG. 9A discloses an example of a wireless communication device including power management in accordance with at least one embodiment of the present invention.

FIG. 11A discloses an exemplary activity diagram including power usage requirements in accordance with at least one embodiment of the present invention.

FIG. 11B discloses an exemplary activity diagram including power usage requirements modified in accordance with at least one embodiment of the present invention.

FIG. 11C discloses another exemplary activity diagram including power usage requirements in accordance with at least one embodiment of the present invention.

FIG. 11D discloses another exemplary activity diagram including power usage requirements modified in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks

Figure 1:
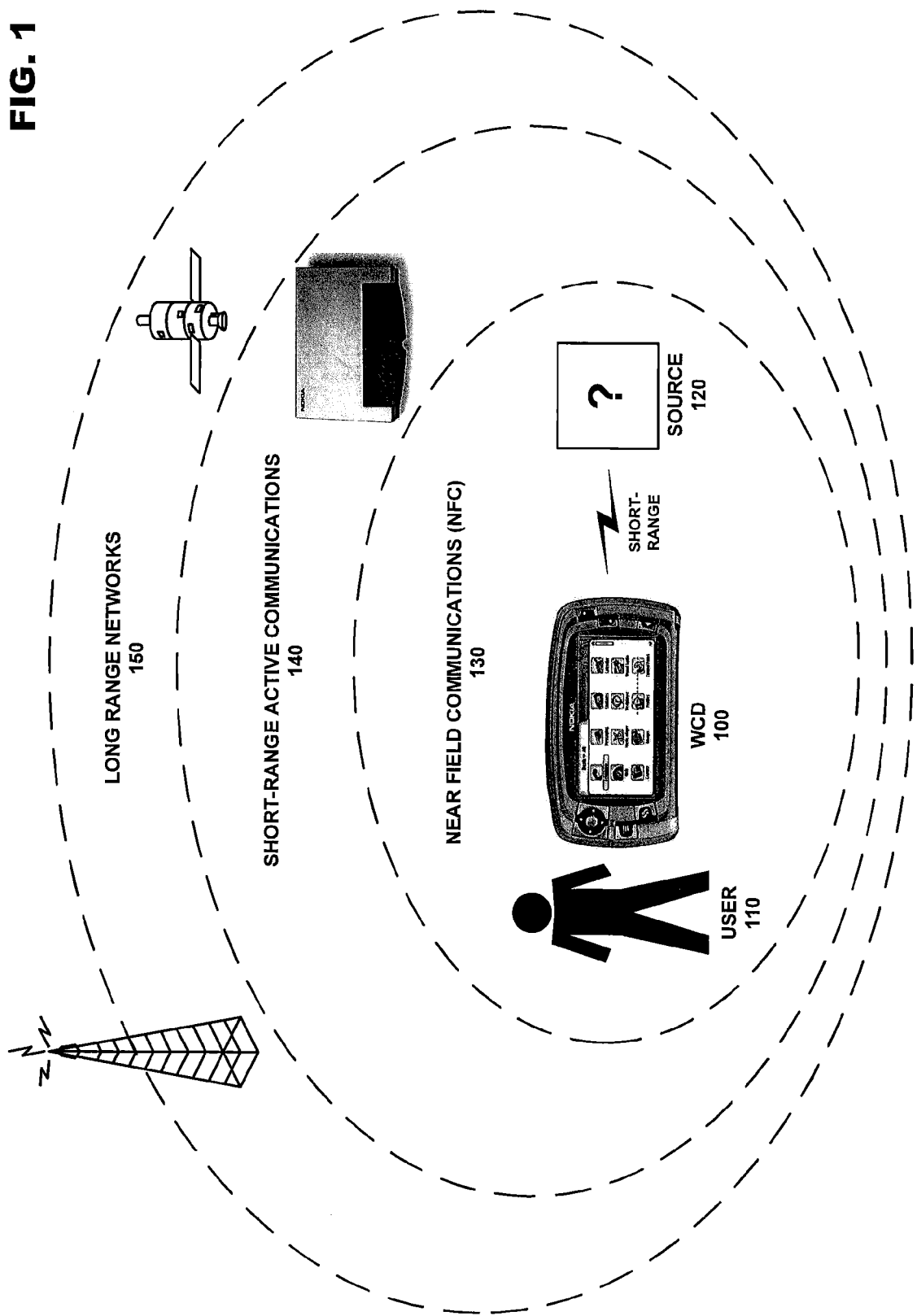
FIG. 1 discloses an exemplary wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communication (NFC) 130 includes various transponder-type interactions wherein normally only the scanning device requires its own power source. WCD 100 scans source 120 via short-range communication. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from a bit to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communication. Short-range active communication 140 includes applications wherein the sending and receiving devices are both active. An exemplary situation would include user 110 coming within effective transmission range of a Bluetooth™, WLAN, UWB, WUSB, etc. access point. In the case of Bluetooth™, a network may automatically be established to transmit information to WCD 100 possessed by user 110. This data may include information of an informative, educational or entertaining nature. The amount of information to be conveyed is unlimited, except that it must all be transferred in the time when user 110 is within effective transmission range of the access point. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 are used to provide virtually uninterrupted communication coverage for WCD 100. Land-based radio stations or satellites are used to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communication aspects of WCD 100. As shown in FIG. 2, communications module 230 may include, for example, long-range communications module 232, short-range communications module 234 and NFC module 236. Communications module 230 may utilize one or more of these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to one or more communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communication utilities modules required to support WCD 100.

Long-range communications 310 performs functions related to the exchange of information over large geographic areas (such as cellular networks) via an antenna. These communication methods include technologies from the previously described 1G to 3G. In addition to basic voice communication (e.g., via GSM), long-range communications 310 may operate to establish data communication sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300, transmission receiver 312 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

NFC 340, also depicted in FIG. 3, may provide functionality related to the short-range scanning of machine-readable data. For example, processor 300 may control components in NFC 340 to generate RF signals for activating an RFID transponder, and may in turn control the reception of signals from an RFID transponder. Other short-range scanning methods for reading machine-readable data that may be supported by the NFC 340 are not limited to IR communication, linear and 2-D (e.g., QR) bar code readers (including processes related to interpreting UPC labels), and optical character recognition devices for reading magnetic, UV, conductive or other types of coded data that may be provided in a tag using suitable ink. In order for the NFC 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, an RFID scanner mounted in an entryway may continuously emit radio frequency waves. When a person with a device containing transponder 380 walks through the door, the transponder is energized and may respond with information identifying the device, the person, etc. In addition, a scanner may be mounted (e.g., as previously discussed above with regard to examples of NFC 340) in WCD 100 so that it can read information from other transponders in the vicinity.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communication components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, NFC 340, user interface 350, transponder 380, etc. through one or more bus interfaces (which may be wired or wireless bus interfaces). Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communication utilities software component, also contained in memory 330, which provides for the establishment of service sessions using long-range communications 310 and/or short-range communications 320. The communication utilities component may include various routines that allow the reception of services from remote devices according to mediums such as the Wireless Application Medium (WAP), Hypertext Markup Language (HTML) variants like Compact HTML (CHTML), etc.

III. Exemplary Operation of a Wireless Communication Device Including Potential Interference Problems Encountered.

Figure 4A:
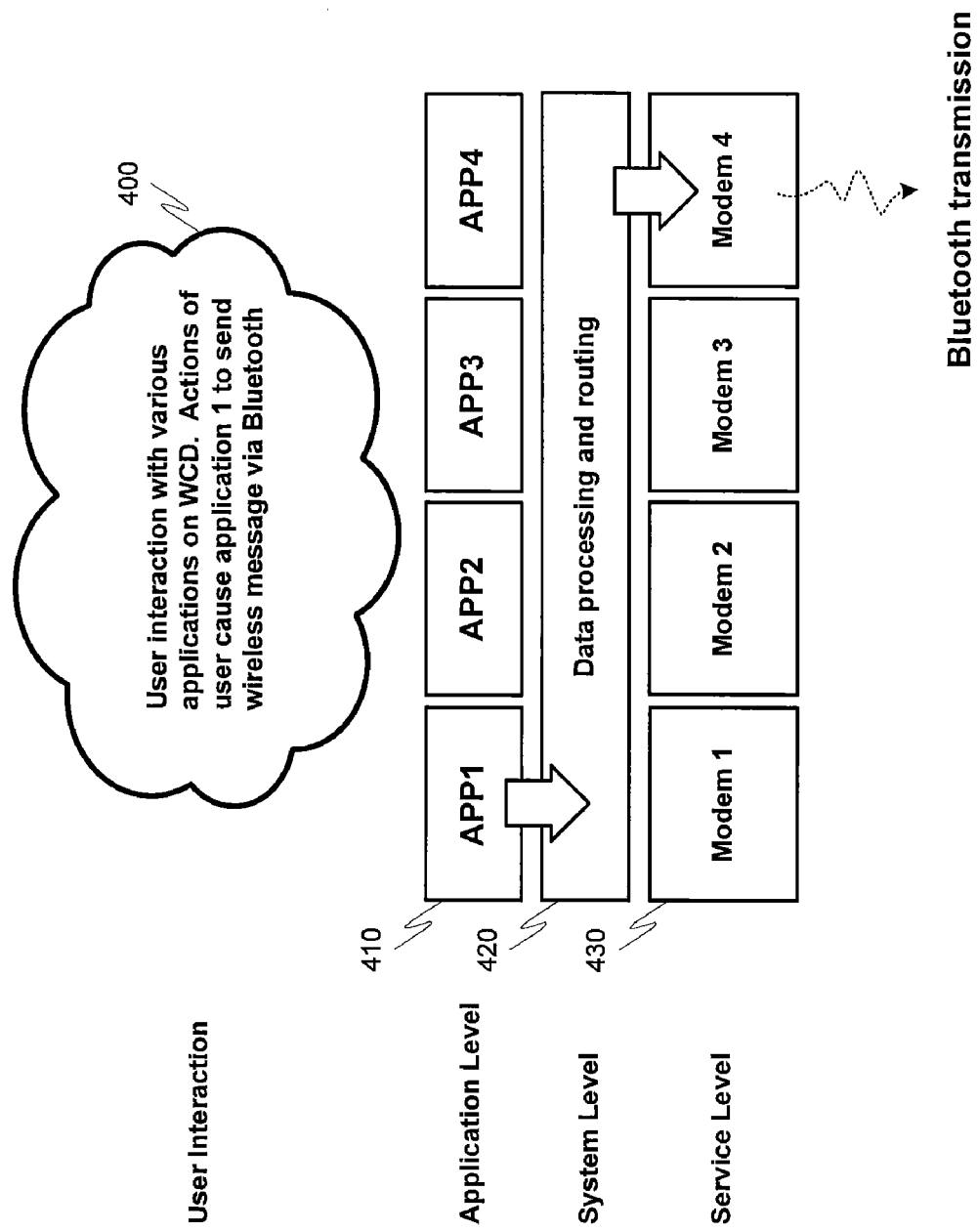
FIG. 4A discloses an exemplary operational description of a wireless communication device utilizing a wireless communication medium in accordance with at least one embodiment of the present invention.

FIG. 4A discloses a stack approach to understanding the operation of a WCD in accordance with at least one embodiment of the present invention. At the top level 400, user 110 interacts with WCD 100. The interaction involves user 110 entering information via user input 360 and receiving information from user output 370 in order to activate functionality in application level 410. In the application level, programs related to specific functionality within the device interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated at application level 410 may require information to be sent from or received into WCD 100. In the example of FIG. 4A, data is requested to be sent to a recipient device via Bluetooth™ communication. As a result, application level 410 may then call resources in the system level to initiate the required processing and routing of data.

System level 420 processes data requests and routes the data for transmission. Processing may include, for example, calculation, translation, conversion and/or packetizing the data. The information may then be routed to an appropriate communication resource in the service level. If the desired communication resource is active and available in the service level 430, the packets may be routed to a radio modem for delivery via wireless transmission. There may be a plurality of modems operating using different wireless mediums. For example, in FIG. 4A, modem 4 is activated and able to send packets using Bluetooth™ communication. However, a radio modem (as a hardware resource) need not be dedicated only to a specific wireless medium, and may be used for different types of communication depending on the requirements of the wireless medium and the hardware characteristics of the radio modem.

FIG. 4B discloses a situation wherein the above described exemplary operational process may cause more than one radio modem to become active. In this case, WCD 100 is both transmitting and receiving information via wireless communication over a multitude of mediums. WCD 100 may be interacting with various secondary devices such as those grouped at 480. For example, these devices may include cellular handsets communicating via long-range wireless communication like GSM, wireless headsets communicating via Bluetooth™, Internet access points communicating via WLAN, etc.

Problems may occur when some or all of these communications are carried on simultaneously. As further shown in FIG. 4B, multiple modems operating simultaneously may cause interference for each other. Such a situation may be encountered when WCD 100 is communicating with more than one external device (as previously described). In an exemplary extreme case, devices with modems simultaneously communicating via Bluetooth™, WLAN and Zigbee would encounter substantial overlap since all of these wireless mediums operate in the 2.4 GHz band. The interference, shown as an overlapping portion of the fields depicted in FIG. 4B, would cause packets to be lost and the need for retransmission of these lost packets. Retransmission requires that future timeslots be used to retransmit lost information, and therefore, overall communication performance will at least be reduced, if the signal is not lost completely. The present invention, in at least one embodiment, seeks to manage problematic situations where possibly conflicting communications may be occurring simultaneously so that interference is minimized or totally avoided, and as a result, speed and quality are maximized.

IV. Examples of Radio Modules Usable in a Wireless Communication Device.

Figure 5A:
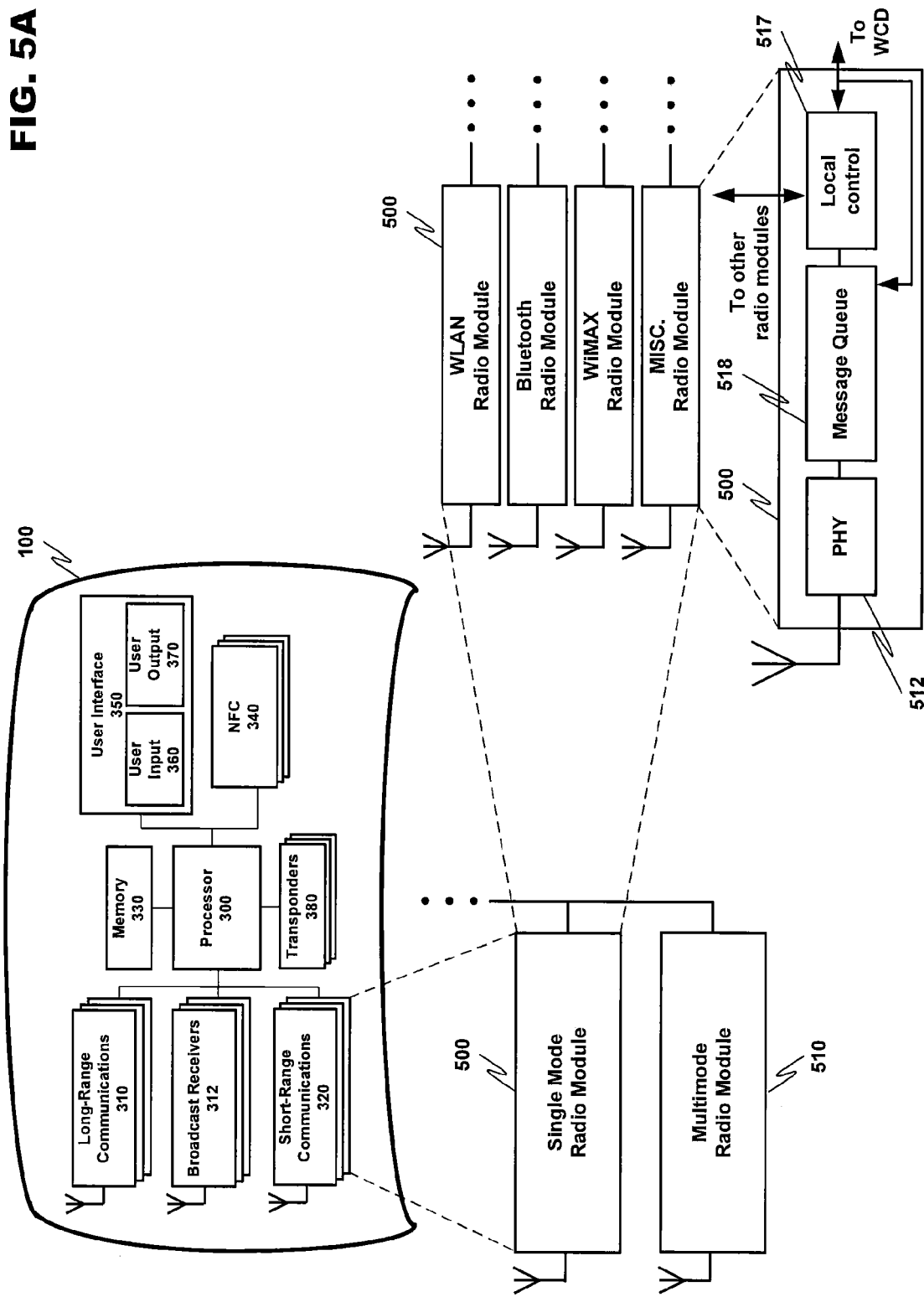
FIG. 5A discloses an example of single mode radio modules usable with at least one embodiment of the present invention.

FIG. 5A discloses two exemplary types of radio modules that can be incorporated into WCD 100. The choice of a particular type of radio module to utilize may depend on various requirements for functionality in WCD 100, or conversely, may be selected based on limitations in the device such as space, complexity and/or power limitations. In the depicted example, radio module 500 is a single mode radio module and radio module 510 is a multimode radio module (explained further in FIG. 5B). Single mode radio module 500 may only support one wireless communication medium at a time (e.g., single mode radio module 500 may be configured to support Bluetooth™ communication) and may further include all hardware and/or software resources required to enable independent operation as shown in FIG. 5A, or alternatively, a plurality of single mode radio modules 500 may share at least some physical resources with other radio modules (e.g., a common physical layer including an antenna or antenna array and associated hardware), depending on the construction and/or configuration of WCD 100.

Since all of the single mode radio modules 500 may compete for available communication resources (e.g., common hardware resources and/or available transmission time), some sort of local control may exist in order to manage how each single mode radio module 500 utilizes these resources. For example, Local controller 517 shown in single mode radio module 500 may control the operation of the radio module. This local controller may take as inputs message information from other components within WCD 100 wishing to send messages via single mode radio module 500, and also information from other single mode radio modules 500 as to their current state. This current state information may include a priority level, an active/inactive state, a number of messages pending, a duration of active communication, etc. Local controller 517 may use this information to control the release of messages from message queue 518 to PHY layer 512, or further, to control the quality level of the messages sent from message queue 518 in order to conserve resources for other wireless communication mediums. The local control in each single mode radio module 500 may take the form of, for example, a schedule for utilization of a wireless communication medium implemented in the radio module.

Figure 5B:
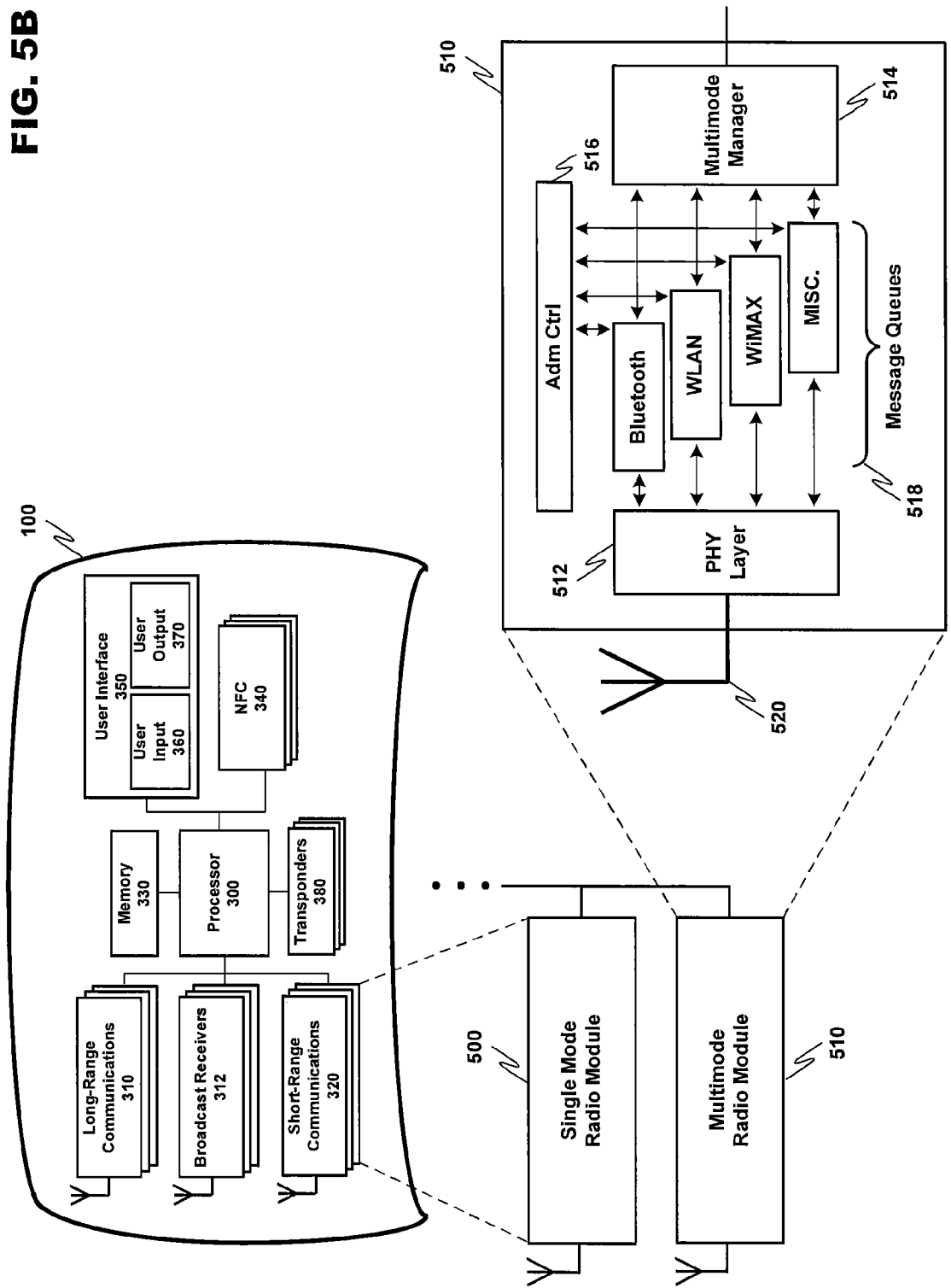
FIG. 5B discloses an example of a multimode radio module usable with at least one embodiment of the present invention.

An exemplary multimode radio module 510 is now explained in FIG. 5B. Multimode radio module 510 may include local control resources for managing each "radio" (e.g., software based radio control stacks) attempting to use the physical layer (PHY) resources of multimode radio module 510. In this example, multimode radio module 510 includes at least three radio stacks or radio protocols (labeled Bluetooth, WLAN and WiMAX in FIG. 5B) that may share the PHY layer resources (e.g., hardware resources, antenna, etc.) of multimode radio module 510. The local control resources may include an admission controller (Adm Ctrl 516) and a multimode controller (Multimode Manager 514). These local control resources may be embodied as a software program and/or in a hardware form (e.g., logic device, gate array, MCM, ASIC, etc.) in a dual-mode radio modem interface, and the radio modem interface may be coupled to, or alternatively, embedded within multimode radio module 510.

Admission control 516 may act as a gateway for the multimode radio module 510 by filtering out both different wireless communication medium requests from the operating system of WCD 100 that may be sent by multimode radio module 510 and that may further result in conflicts for multimode radio module 510. The conflict information may be sent along with operational schedule information for other radio modules to multimode manager 514 for further processing. The information received by multimode manager 514 may then be used to formulate a schedule, such as a schedule for utilization of wireless communication mediums, controlling the release of messages for transmission from the various message queues 518.

V. A Wireless Communication Device Including a Multiradio Controller.

In an attempt to better manage communication in WCD 100, an additional controller dedicated to managing wireless communication may be introduced. WCD 100, as pictured in FIG. 6A, includes a multiradio controller (MRC) 600 in accordance with at least one embodiment of the present invention. MRC 600 is coupled to the master control system of WCD 100. This coupling enables MRC 600 to communicate with radio modems or other similar devices in communications modules 310 312, 320 and 340 via the master operating system of WCD 100.

Figure 6A:
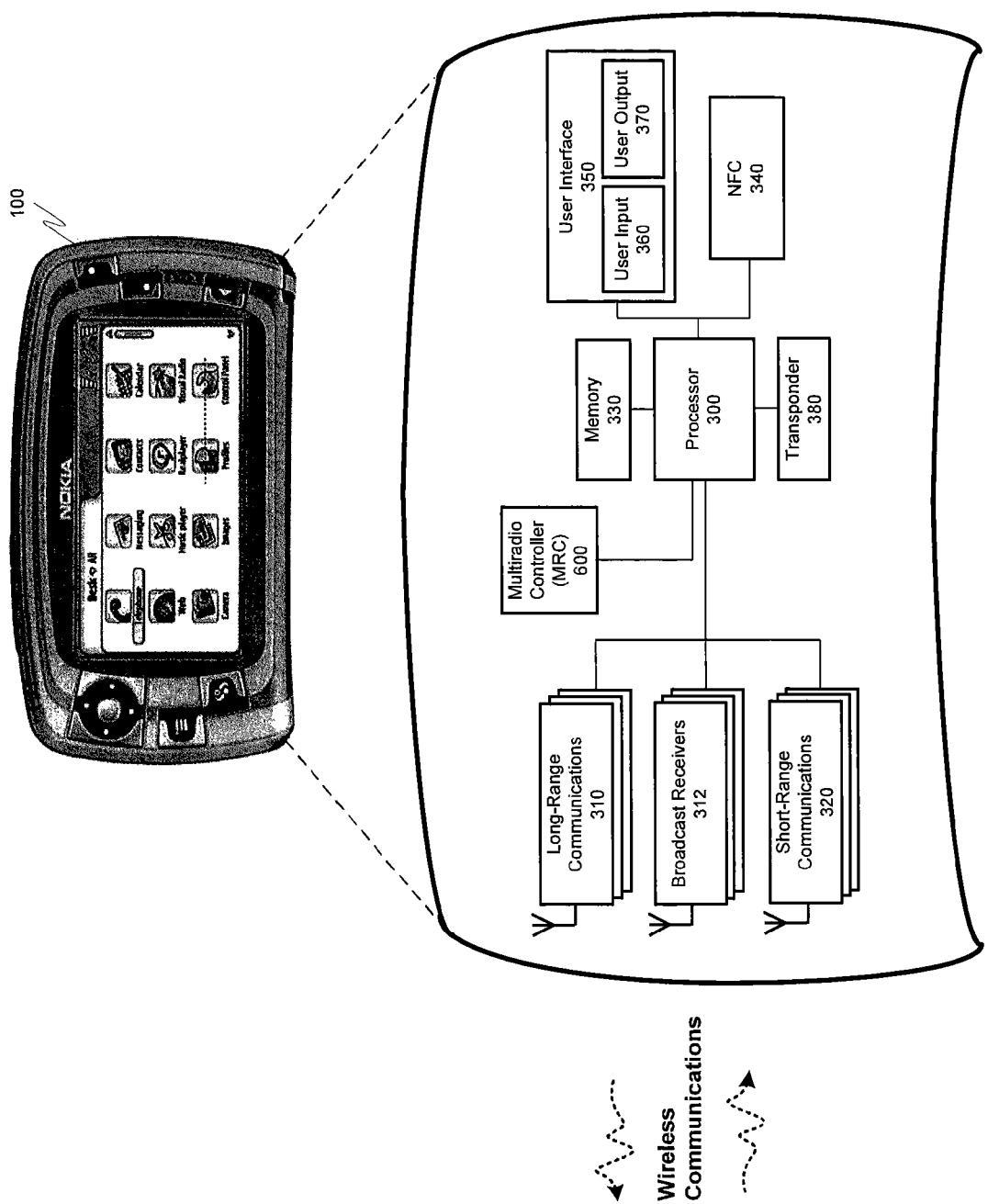
FIG. 6A discloses an exemplary structural description of a wireless communication device including a multiradio controller in accordance with at least one embodiment of the present invention.

FIG. 6B discloses in detail at least one embodiment of WCD 100, which may include multiradio controller (MRC) 600 introduced in FIG. 6A in accordance with at least one embodiment of the present invention. MRC 600 includes common interface 620 by which information may be sent or received through master control system 640. Radio modems 610 and other devices 630 may also be referred to as "modules" in this disclosure as they may contain supporting hardware and/or software resources in addition to the modem itself. These resources may include control, interface and/or processing resources. For example, each radio modem 610 or similar communication device 630 (e.g., an RFID scanner for scanning machine-readable information) may also include some sort of common interface 620 for communicating with master control system 640. As a result, all information, commands, etc. occurring between radio modems 610, similar devices 630 and MRC 600 are conveyed by the communication resources of master control system 640. The possible effect of sharing communication resources with all the other functional modules within WCD 100 will be discussed with respect to FIG. 6C.

Figure 6C:
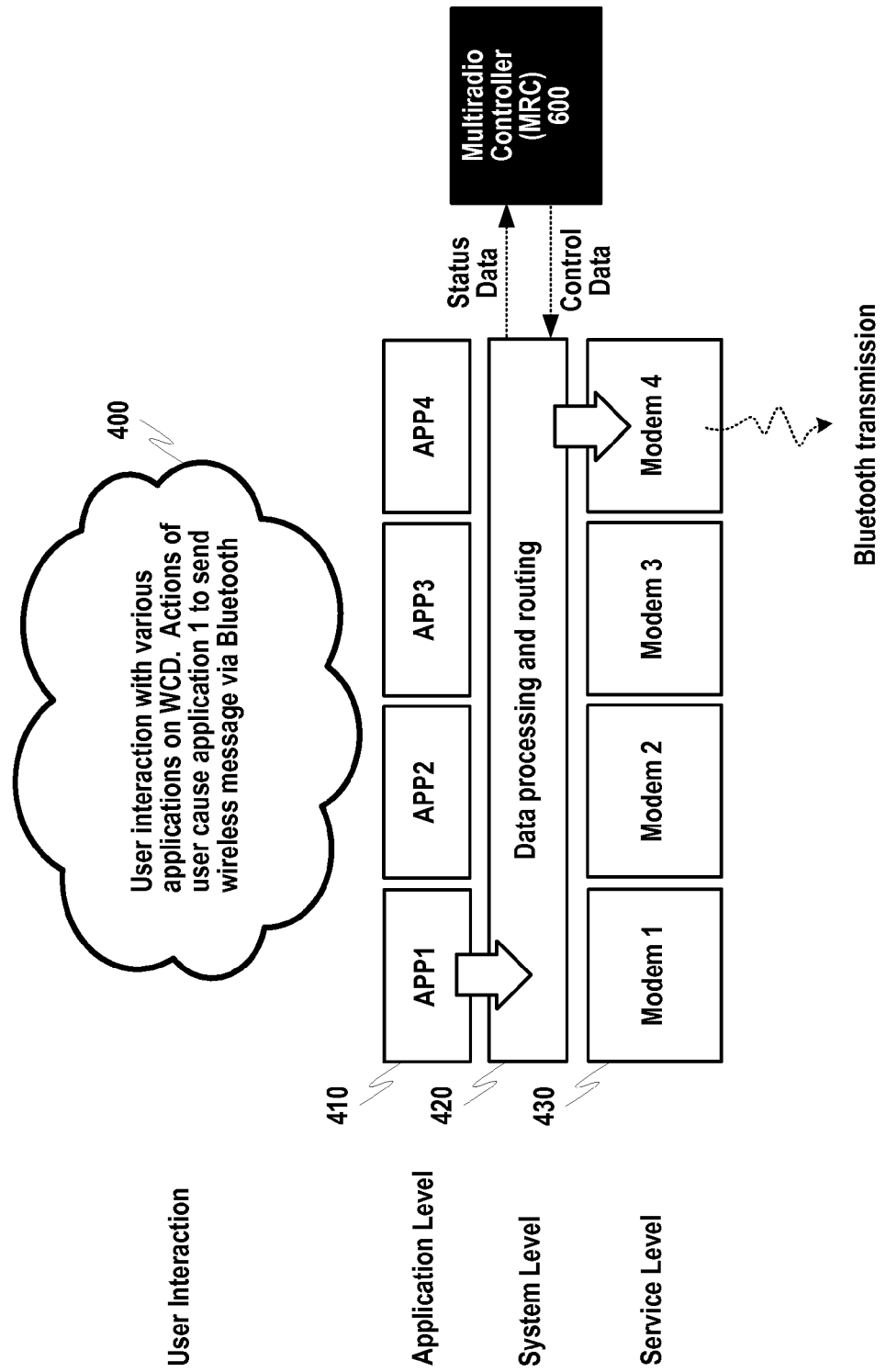
FIG. 6C discloses an exemplary operational description of a wireless communication device including a multiradio controller in accordance with at least one embodiment of the present invention.

FIG. 6C discloses an operational diagram similar to FIG. 4 including the effect of MRC 600 in accordance with at least one embodiment of the present invention. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems. However, problems may occur when the operations of WCD 100 are fully employed. Since the various applications in application level 410, the operating system in system level 420, the communication devices in service level 430 and MRC 600 must all share the same communication system, delays may occur when all aspects of WCD 100 are trying to communicate on the common interface system 620. As a result, delay sensitive information regarding both communication resource status information and radio modem 610 control information may become delayed, nullifying any beneficial effect from MRC 600. Therefore, a system better able to handle the differentiation and routing of delay sensitive information is required if the beneficial effect of MRC 600 is to be realized.

VI. A Wireless Communication Device Including a Multiradio Control System.

Figure 7A:
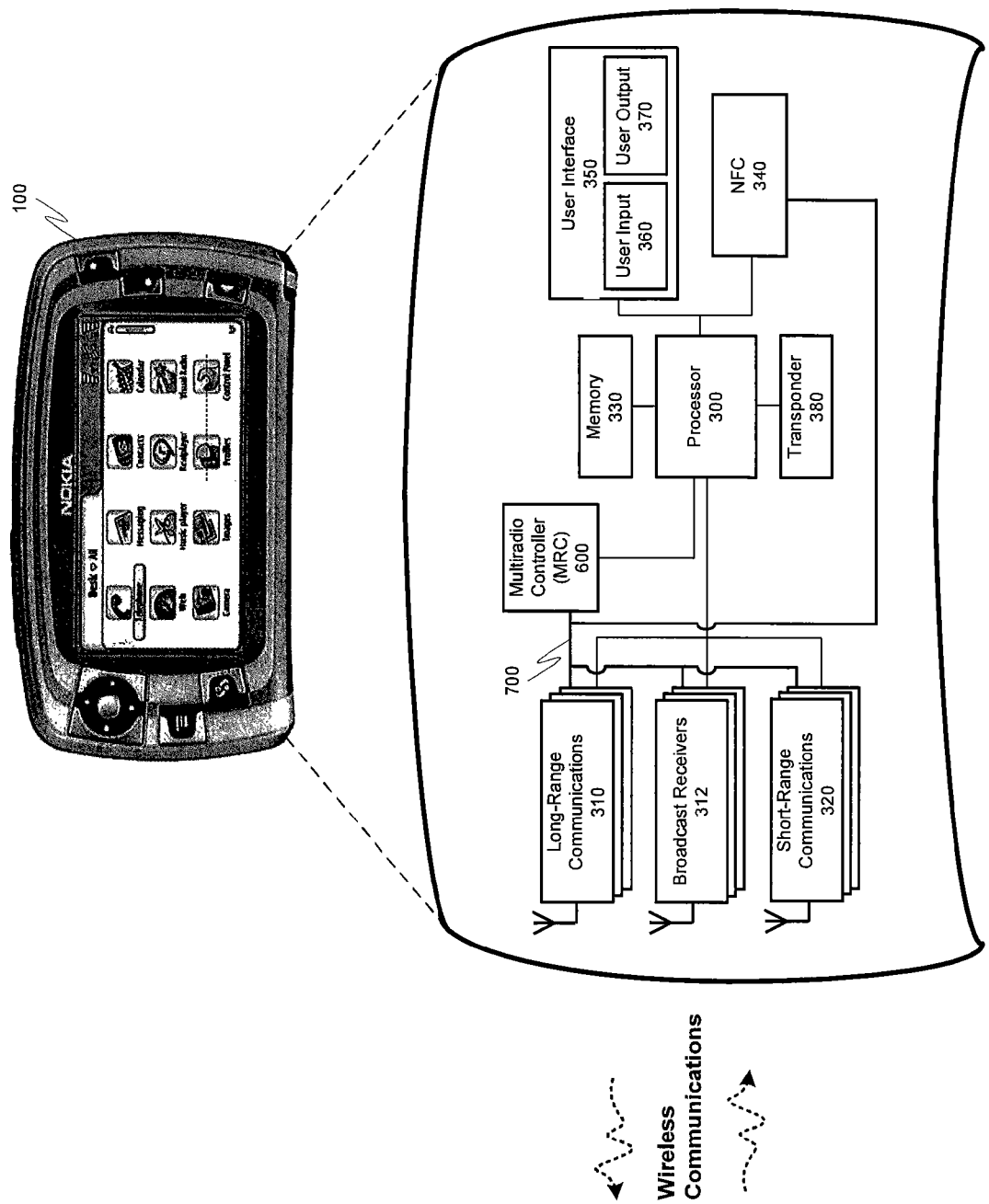
FIG. 7A discloses an exemplary structural description of a wireless communication device including a multiradio control system in accordance with at least one embodiment of the present invention.

FIG. 7A introduces MRC 600 as part of a multiradio control system (MCS) 700 in WCD 100 in accordance with at least one embodiment of the present invention. MCS 700 directly links the communication resources of modules 310, 312, 320 and 340 to MRC 600. MCS 700 may provide a dedicated low-traffic communication structure for carrying delay sensitive information both to and from MRC 600.

Additional detail is shown in FIG. 7B. MCS 700 forms a direct link between MRC 600 and the communication resources of WCD 100. This link may be established by a system of dedicated MCS interfaces 710 and 760. For example, MCS interface 760 may be coupled to MRC 600. MCS Interfaces 710 may connect radio modems 610 and other similar communication devices 630 to MCS 700 in order to form an information conveyance for allowing delay sensitive information to travel to and from MRC 600. In this way, the abilities of MRC 600 are no longer influenced by the processing load of master control system 640. As a result, any information still communicated by master control system 640 to and from MRC 600 may be deemed delay tolerant, and therefore, the actual arrival time of this information does not substantially influence system performance. On the other hand, all delay sensitive information is directed to MCS 700, and therefore is insulated from the loading of the master control system.

The effect of MCS 700 is seen in FIG. 7C in accordance with at least one embodiment of the present invention. Information may now be received in MRC 600 from at least two sources. System level 420 may continue to provide information to MRC 600 through master control system 640. In addition, service level 430 may specifically provide delay sensitive information conveyed by MCS 700. MRC 600 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive)

information includes at least modem operational information that frequently changes during the course of a wireless connection, and therefore, requires immediate update. As a result, delay sensitive information may need to be delivered directly from the plurality of radio modems 610 through the MCS interfaces 710 and 760 to MRC 600, and may include radio modem synchronization information. Delay sensitive information may be provided in response to a request by MRC 600, or may be delivered as a result of a change in radio modem settings during transmission, as will be discussed with respect to synchronization below.

MCS interface 710 may be used to (1) Exchange synchronization information, and (2) Transmit identification or prioritization information between various system components. In addition, as previously stated, MCS interface 710 is used to communicate the radio parameters that are delay sensitive from a controlling point of view. MCS interface 710 can be shared between different radio modems (multipoint) but it cannot be shared with any other functionality that could limit the usage of MCS interface 710 from a latency point of view.

The control signals sent on MCS 700 that may enable/disable a radio modem 610 should be built on a modem's periodic events. This kind of event can be, for example, frame clock event in GSM (4.615 ms), slot clock event in Bluetooth™ (625 us) or targeted beacon transmission time in WLAN (100 ms) or any multiple of these. A radio modem 610 may send its synchronization indications when (1) Any radio modem 610 requests it, (2) a radio modem internal time reference is changed (e.g. due to handover or handoff). The latency requirement for the synchronization signal is not critical as long as the delay is constant within a few microseconds. The fixed delays can be taken into account in the scheduling logic of MRC 600.

For predictive wireless communication mediums, the radio modem activity control may be based on the knowledge of when the active radio modems 610 are about to transmit (or receive) in the specific connection mode in which the radios are currently operating. The connection mode of each radio modem 610 may be mapped to the time domain operation in their respective local control. As an example, for a GSM speech connection, priority controller 740 may have knowledge about all traffic patterns of GSM. This information may be transferred to the appropriate local control when radio modem 610 becomes active, which may then recognize that the speech connection in GSM includes one transmission slot of length 577 μs, followed by an empty slot after which is the reception slot of 577 μs, two empty slots, monitoring (RX on), two empty slots, and then it repeats. Dual transfer mode means two transmission slots, empty slot, reception slot, empty slot, monitoring and two empty slots. When all traffic patterns are known, a controller only needs to know when the transmission slot occurs in time to gain knowledge of when the GSM radio modem is active. When active radio modem 610 is about to transmit (or receive) it must check every time whether the modem activity control signal permits the communication per any local control entity, which is always either allowing or disabling the transmission of one full radio transmission block (e.g., GSM slot).

An example message packet 800 is disclosed in FIG. 8 in accordance with at least one embodiment of the present invention. Example message packet 800 includes activity pattern information that may be formulated by MRC 600. The data payload of packet 800 may include, in at least one embodiment of the present invention, at least Message ID information, allowed/disallowed transmission (Tx) period information, allowed/disallowed reception (Rx) period information, Tx/Rx periodicity (how often the Tx/Rx activities contained in the period information occur), and validity information describing when the activity pattern becomes valid and whether the new activity pattern is replacing or added to the existing one. The data payload of packet 800, as shown, may consist of multiple allowed/disallowed periods for transmission or reception (e.g., Tx period 1, 2 . . . ) each containing at least a period start time and a period end time during which radio modem 610 may either be permitted or prevented from executing a communication activity. Further, changes in radio modem 610 activity patterns may be amended using the validity information in each message packet 800.

The modem activity control signal (e.g., packet 800) may be formulated by MRC 600 and transmitted on MCS 700. The signal includes activity periods for Tx and Rx separately, and the periodicity of the activity for the radio modem 610. While the native radio modem clock is the controlling time domain (never overwritten), the time reference utilized in synchronizing the activity periods to current radio modem operation may be based on one of at least two standards. In a first example, a transmission period may start after a pre-defined amount of synchronization events have occurred in radio modem 610. Alternatively, all timing for MRC 600 may be standardized around the system clock for WCD 100. Advantages and disadvantages exist for both solutions. Using a defined number of modem synchronization events is beneficial because then all timing is closely aligned with the radio modem clock. However, this strategy may be more complicated to implement than basing timing on the system clock. On the other hand, while timing based on the system clock may be easier to implement as a standard, conversion to modem clock timing must necessarily be implemented whenever a new activity pattern is installed in radio modem 610.

The activity period may be indicated as start and stop times. If there is only one active connection, or if there is no need to schedule the active connections, the modem activity control signal may be set always on allowing the radio modems to operate without restriction. The radio modem 610 should check whether the transmission or reception is allowed before attempting actual communication. The activity end time can be used to check the synchronization. Once the radio modem 610 has ended the transaction (slot/packet/burst), it can check whether the activity signal is still set (it should be due to margins). If this is not the case, the radio modem 610 can initiate a new synchronization with MRC 600. The same happens if a radio modem time reference or connection mode changes. A problem may occur if MRC 600 runs out of the modem synchronization and starts to apply modem transmission/reception restrictions at the wrong time. Due to this, modem synchronization signals need to be updated periodically. The more active wireless connections, the more accuracy is required in synchronization information.

VII. Radio Modem Interface to Other Devices.

As a part of information acquisition services, the MCS interface 710 needs to send information to MRC 600 about periodic events of the radio modems 610. Using its MCS interface 710, the radio modem 610 may indicate a time instance of a periodic event related to its operation. In practice these instances are times when radio modem 610 is active and may be preparing to communicate or communicating. Events occurring prior to or during a transmission or reception mode may be used as a time reference (e.g., in case of GSM, the frame edge may be indicated in a modem that is not necessarily transmitting or receiving at that moment, but we know based on the frame clock that the modem is going to transmit [x]ms after the frame clock edge). Basic principle for such timing indications is that the event is periodic in nature. Every incident needs not to be indicated, but the MRC 600 may calculate intermediate incidents itself. In order for that to be possible, the controller would also require other relevant information about the event, e.g. periodicity and duration. This information may be either embedded in the indication or the controller may get it by other means. Most importantly, these timing indications need to be such that the controller can acquire a radio modem's basic periodicity and timing. The timing of an event may either be in the indication itself, or it may be implicitly defined from the indication information by MRC 600.

In general terms these timing indications need to be provided on periodic events like: schedule broadcasts from a base station (typically TDMA/MAC frame boundaries) and own periodic transmission or reception periods (typically Tx/Rx slots). Those notifications need to be issued by the radio modem 610: (1) on network entry (i.e. modem acquires network synchrony), (2) on periodic event timing change e.g. due to a handoff or handover and (3) as per the policy and configuration settings in the multiradio controller.

In at least one embodiment of the present invention, the various messages exchanged between the aforementioned communication components in WCD 100 may be used to dictate behavior on both a local (radio modem level) and global (WCD level) basis. MRC 600 may deliver a schedule to radio modem 610 with the intent of controlling that specific modem, however, radio modem 610 may not be compelled to conform to this schedule. The basic principle is that radio modem 610 is not only operating according to multiradio control information (e.g., operates only when MRC 600 allows) but is also performing internal scheduling and link adaptation while taking MRC scheduling information into account.

VIII. Power Management System Configuration.

FIG. 9A discloses an exemplary configuration for WCD 100 in accordance with at least one embodiment of the present invention. FIG. 9A adds a power controller 900 to WCD 100. This controller has been depicted as a standalone device coupled to other components, for example, via a common interface 620 and possibly also to MCS 700 via MCS Interface 780 (e.g., a dotted line 902 shows an optional connection coupling MCS Interface 780 to MCS 700). However, other configurations are also possible. For example, power controller 900 may be implemented as a software application within the main processor 300 of WCD 100, or may be incorporated into MRC 600 in order to form a combined communication and power controller.

In at least one exemplary control architecture there may actually be separate energy management (EM) hardware and software that correspond to power controller 900 as disclosed in FIG. 9A. An EM ASIC may handle all power related tasks. At the HW level, the EM ASIC may receive information regarding the total power consumption of the device. This component may be coupled with a software-implemented energy management server, or EM server, that receives the information on power usage in WCD 100 from the EM ASIC. The EM server may also be configured to access predetermined or calculated constraint information in WCD 100 including a maximum power usage threshold. The EM server may further receive information concerning the power consumption of subsystems in WCD 100 other than radio modules 610. The EM ASIC can either be informed of this usage, or it may be estimated based on one or more of the frequency, voltage, activity time (load) and active components in the various subsystems of WCD 100. Based on the power usage information, power controller 900 may calculate a maximum allowed power usage for the communication subsystems (e.g., radio modules 610) and inform the MRC 600. This allowed power notification may be conveyed through a connection management entity (not pictured), common interface 620 or MCS 700.

Figure 9B:
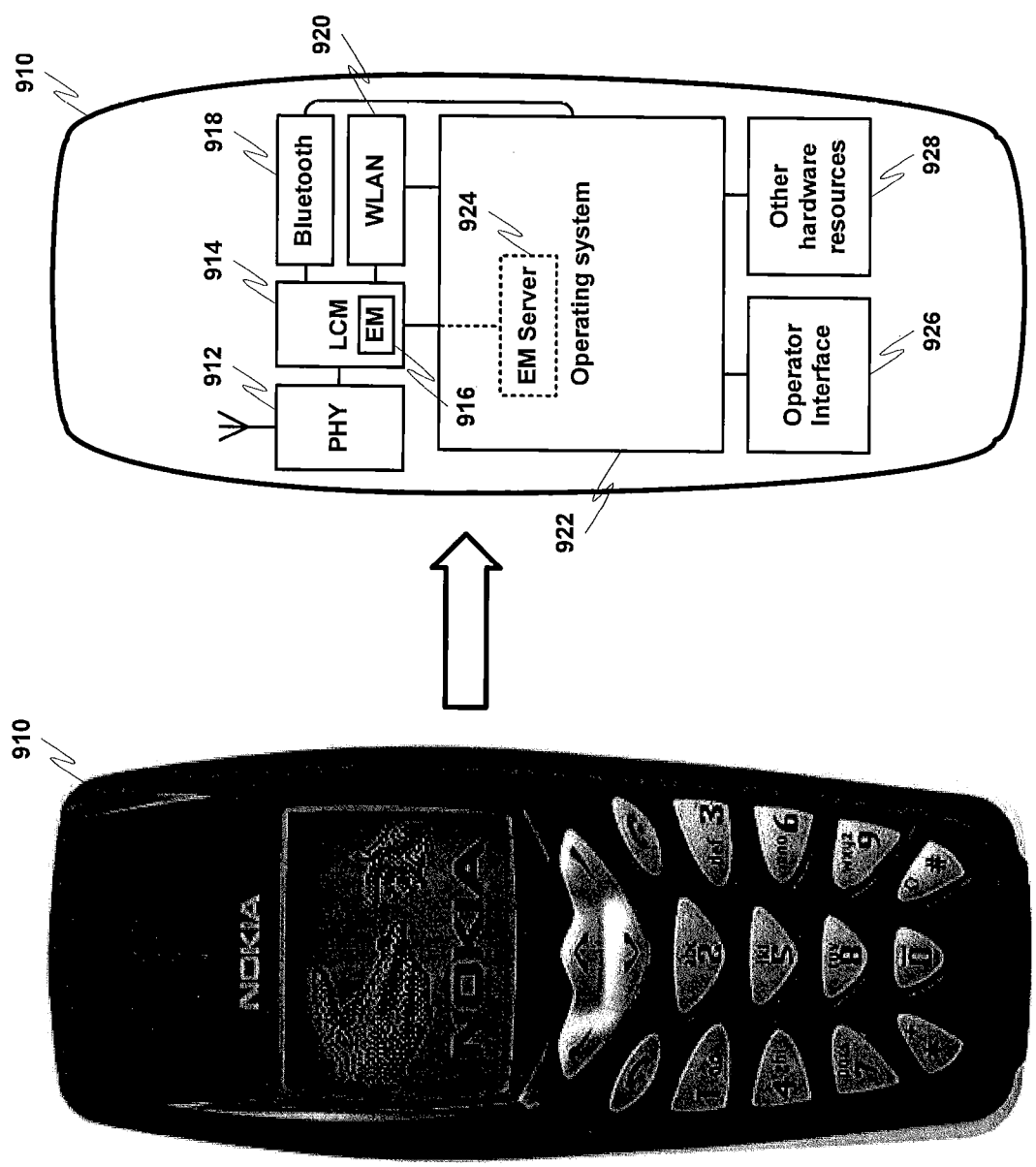
FIG. 9B discloses another example of a wireless communication device including power management in accordance with at least one embodiment of the present invention.

Now referring to FIG. 9B, an alternative configuration usable, for example, in a simpler WCD (e.g., cellular device 910) is disclosed in accordance with at least one embodiment of the present invention. Cellular device 910 may include similar hardware and software resources as WCD 100 with respect to at least operating system 922, operator interface 926 and other hardware resources 928 (e.g., hardware supporting long-range cellular communication). The device may further include one or more radio modules 610 for supporting various wireless communication mediums. In this exemplary configuration, a physical layer (PHY) 912 (e.g., at least one antenna and other hardware/software resources supporting the transmission/reception functions) may be shared by a Bluetooth™ radio module 918 and WLAN radio module 920. The use of a common PHY 912 by two or more radio modules 610 may require some control aspect to manage the usage of these transmission/reception resources. As previously described, in a more sophisticated device this control may include at least MRC 600. However, the control features may also be integrated as part of a standard communication chipset in simpler devices.

In Cellular device 910, a local controller module (LCM) 914 may perform multiple functions. Initially, it may manage the usage of common PHY 912 by Bluetooth™ radio module 918 and WLAN radio module 920. It may serve this function by receiving information about communication activity and/or radio status from these components and/or operating system 922. Further, in accordance with at least one embodiment of the present invention, LCM 914 may also include power management features. For example, energy management component (EM) 916 is shown within LCM 914. EM 916 may be a function integrated (e.g., hard-coded) into the core local controller chipset, or may be a stand-alone component that may be coupled to LCM 914. EM 916 may further receive information regarding power usage in cellular device 910, and report this information to LCM 914. In another exemplary scenario, EM server 924 may be implemented in operating system 922 (e.g., as a software module) in order to collect power usage information in cellular device 910. The power usage may then be reported to EM 916. Processing of power usage information, and the further determination of a maximum allowed power threshold, may be handled by one or both of these energy management resources.

After receiving information including, for example, current communication activity information for cellular device 910, current power usage information for cellular device 910 and current allowed power usage threshold information for cellular device 910, LCM 914 may utilize this information to manage usage of PHY 912. This management may include, for example, an analysis in view of current activity and power requirements to determine how to schedule packet transmission from Bluetooth™ radio module 918 and WLAN radio module 920. LCM 914 may, for example, determine that WLAN radio module 920 may access PHY 912 (e.g., due to this resource not being utilized by Bluetooth™ radio module 918). However, due to the current allowed power usage threshold in cellular device 910 determined, for example, in view of the current power usage in the device vs. the current battery charge level, the use of PHY 912 by WLAN radio module 920 may be disallowed. Using this exemplary integrated configuration, a beneficial power management strategy may be implemented in a less sophisticated device.

IX. Power Management System Operation.

The present invention, in at least one embodiment, may operate to ensure that a maximum power usage threshold is not exceeded in WCD 100. It is important to note that in some cases this maximum power usage threshold may change, for example, as a battery in WCD 100 becomes depleted. Therefore, the power usage threshold may be recalculated on a real time, periodic, event triggered, etc. basis in accordance with the current condition of WCD 100.

Figure 10:
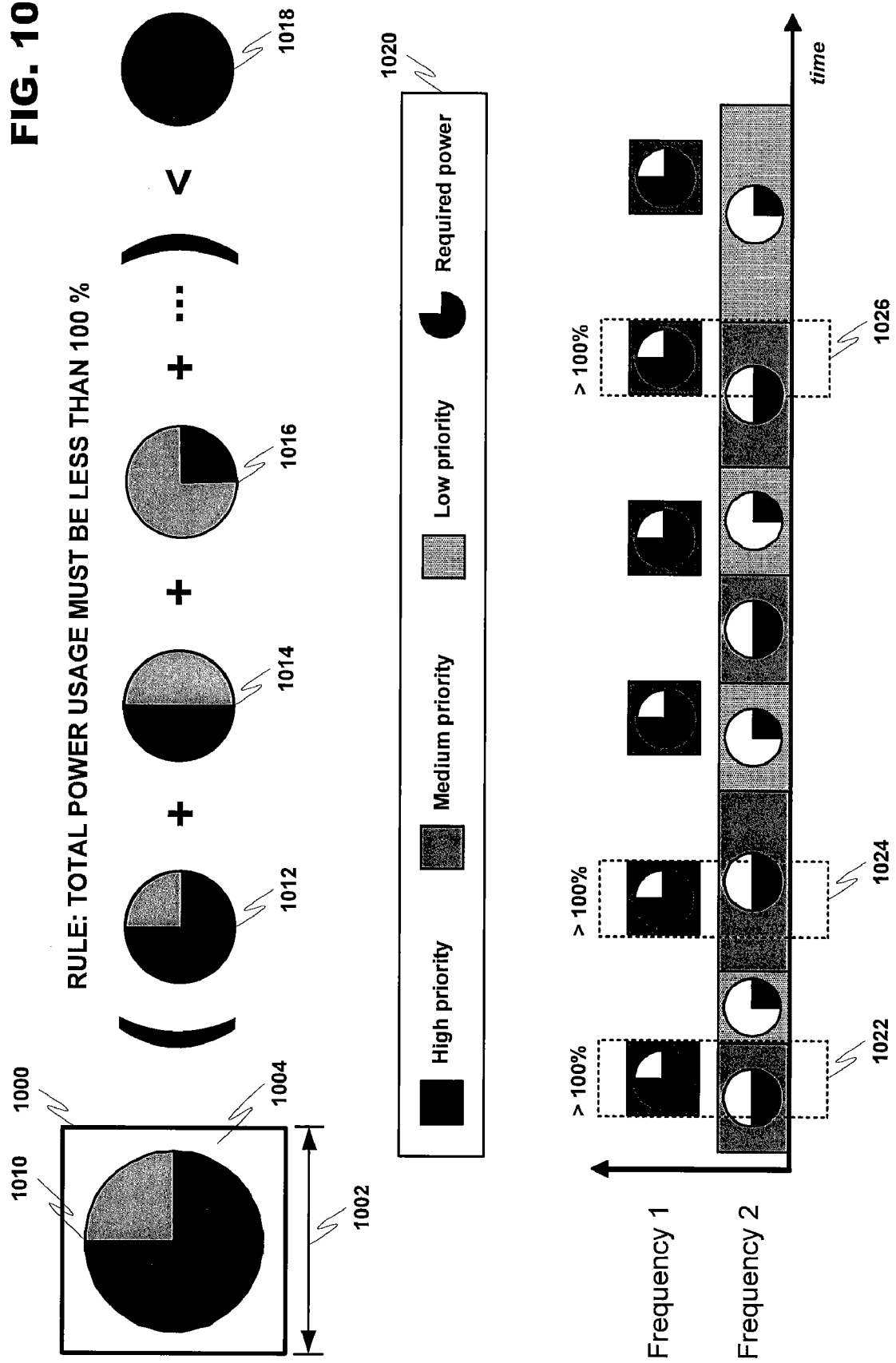
FIG. 10 discloses an exemplary activity diagram including power usage requirements in accordance with at least one embodiment of the present invention.

FIG. 10 discloses an exemplary activity diagram for viewing the impact that at least one embodiment of the present invention has on the operation of communication in WCD 100. The activity diagram discloses various characteristics of operation at particular instances in time. An example timeslot is shown at 1000. The length, depicted at 1002, represents the duration of timeslot 1000. The color or pattern fill 1004 may further indicate a priority level for the wireless communication medium utilizing the timeslot. As further explained in the legend 1020, these patterns and/or colors may signify high priority, medium priority or low priority activities are scheduled. The circular indicia 1010 contained in the rectangular timeslot 1000 signifies a power requirement for the particular activity allocated to timeslot 1000. Further, as shown in examples 1012 to 1018, the total power requirement for any particular instance (e.g. 1012+1014+1016) must not exceed 100% (e.g., 1018), with 100% being applicable to the total allowed power, not the total available power. Of course, the total available power usage cannot exceed 100%, however, the total allowed power usage may be somewhat less than 100%, and as a result, could conceivably be exceeded during a time period when WCD 100 is multitasking.

The exemplary activity diagram disclosed below legend 1020 in FIG. 10 shows example instances where the total allowed power usage is exceeded. Initially, the operation of two different frequencies are shown. These frequencies may represent, for example, two different wireless communication mediums such as Bluetooth™ and WLAN. The periodic timeslots shown in "Frequency 1" are high priority timeslots as designated by their color code 1004. For example, these timeslots may be reserved for Bluetooth™ Synchronous Connection Oriented Link (SCO) packets. A SCO link reserves slots between the master and the slave and can therefore be considered to provide a circuit switched connection. SCO is usually used to support time critical information (e.g. voice packets), and therefore, SCO packets are never retransmitted. In this example, the lack of any ability to retransmit lost packets makes the successful delivery of the packets essential, and therefore, high priority. "Frequency 2" may include another wireless communication medium that is capable of substantially simultaneous communication with another wireless communication medium operating in Frequency 1.

In accordance with at least one embodiment of the present invention, a total or overall power usage may be measured for activities that occur substantially at the same time in WCD 100. When these activities are summed, the power usage should not exceed 100%. The activity diagram in FIG. 10 shows three examples, 1022-1026, wherein the maximum allowed power usage has been exceeded. This can be observed because the total power usage, when summed, is greater than 100%. In these example cases it appears that resources in WCD 100 are utilizing about 125% of the allowed power usage. Again, greater than 100% power usage may occur because the power threshold does not represent the maximum power that can be supplied by a power source. Instead, it represents the maximum power that is allowed to be used at a particular time as a result of a determination made by one or more control entities in WCD 100.

Despite the greater than 100% power usage depicted at instances 1022-1026, WCD may continue to function normally in the short term. However, over time this operation may lead to unstable operation in WCD 100. This may cause user 110 to have to reboot the device frequently, decreasing the overall benefits that may be experienced by using WCD 100. Further, excessive accelerated battery drainage may, in some cases, cause damage to a battery, and possibly even damage to WCD 100. In at least one application of the present invention, these possible problems may be avoided by controlling instantaneous power usage in WCD 100 in order to maintain usage below a certain threshold.

FIG. 11A discloses the same problematic example depicted in FIG. 10 so that it may be visually compared to a reorganized activity schedule in accordance with at least one embodiment of the present invention. FIG. 11B gives an example of the effect of power management in the present invention. Initially, it may be observed that timeslot assignments in frequency 1 have not changed. These assignments may remain due to the fact that they are deemed high priority activities at these instances in time. As a result, other timeslot assignments may be reorganized in order to avoid power usage climbing over 100%. At 1100 the medium priority timeslot in frequency 2 is now divided by the lower priority timeslot which falls at the same instance and duration as the high priority timeslot in frequency 1. Since the low priority activity requires less power (half as much as the requirement for the medium power timeslot) the actual power usage at this instance in time will not exceed 100%. A similar schedule revision may also occur at 1102, however, in this example the duration of the medium priority timeslot is shortened in order to maintain the power usage level below the allowed threshold in WCD 100.

The time period depicted at 1104 discloses a different situation. In this small gap of time there is no communication that may be scheduled to maintain the power level below 100%. The previous low priority (and low power) timeslot has completed, and the next activity that may be scheduled would use too much power. As a result, this small space of time may be inactive for Frequency 2. Further, timeslots may be shortened, and new timeslots added, as shown in 1106-1108. In this example, medium priority timeslot 1106 and low priority timeslot 1108 may be shortened in order to avoid a potential over-usage situation. In order to adjust for the shortening of the original timeslots, additional timeslots 1110 and 1112 may be added in order to allow the activities scheduled for the original larger timeslots to complete execution.

FIGS. 11C and 11D present another exemplary scenario wherein a schedule may be in compliance at the outset, but then exceed an adjusted threshold. FIG. 11C is scheduled so that at any given time the planned power usage in WCD 100 will not exceed 100%. The planned activities occur in three different frequencies (frequency 1-3). The highest priority activity (e.g., timeslot 1150) may occur in frequency 1, while frequency 2 and 3 may include medium 1152 and low 1162 priority activities. However, conditions in WCD 100 may change over time. For example, a battery may become depleted due to continued use of various features in WCD 100. As a result, the power usage threshold may drop, causing the schedule to be out of compliance.

FIG. 11D shows the schedule being reallocated to allow operation at 75% of the original allowed power usage threshold. In this example, timeslots 1160-1164 do not overlap as the original timeslots 1150-1154 did in FIG. 11C. This is because the substantially simultaneous operation of these activities may cause the readjusted allowed power usage threshold to be exceeded. Further, the allowed operation time for the low priority activity 1164 has been drastically reduced. This may occur because a certain amount of time may be allocated to the higher priority activities, and since no activity can overlap due to power limits, the small amount of time left over is all that can be allocated to the low priority activity 1164. In this way, stability in overall operations of WCD 100 may be maintained while managing power usage, albeit these operations may execute at a slower rate due to the reduced duration of the allocated timeslots.

Figure 12:
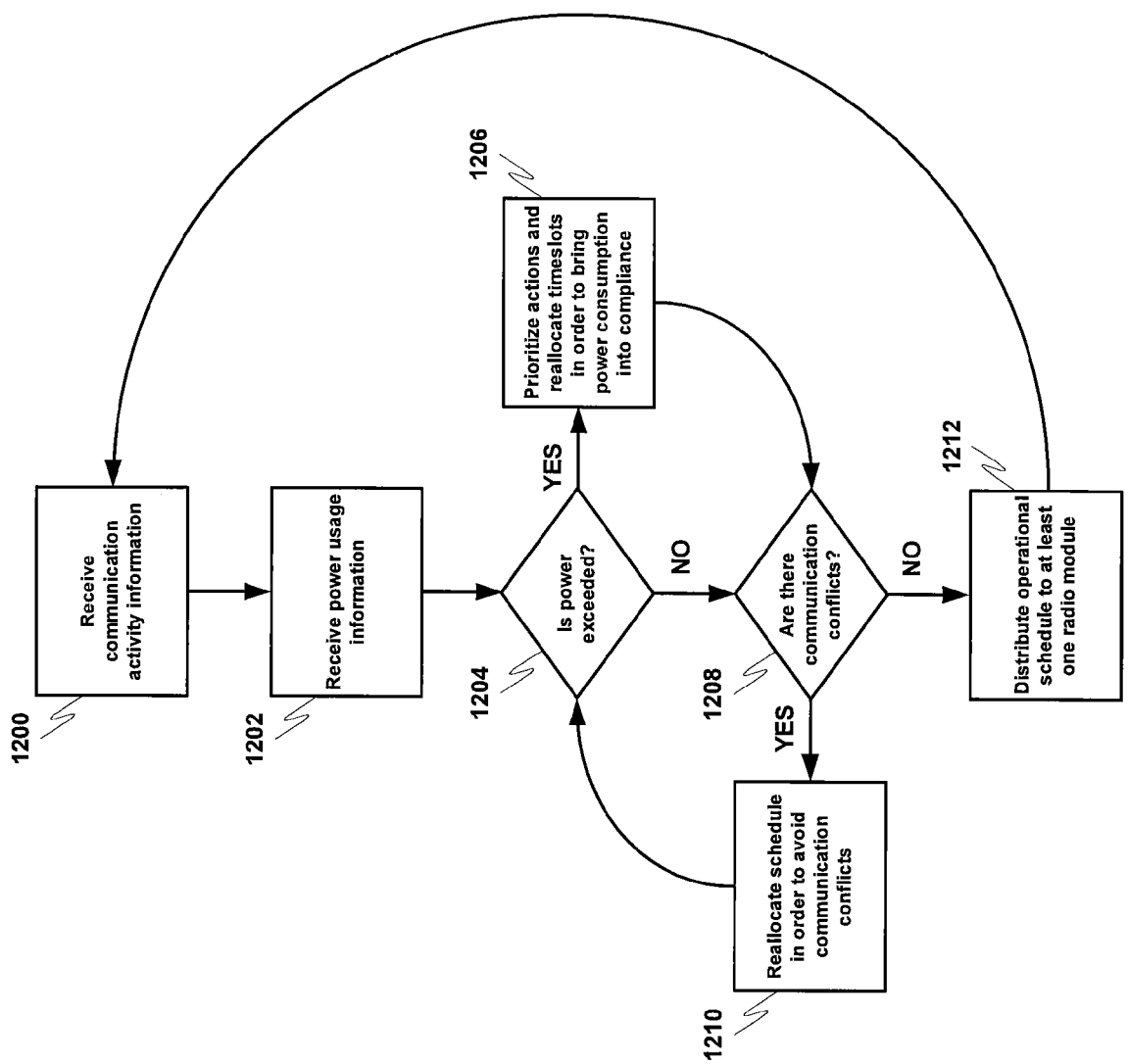
FIG. 12 discloses an exemplary flowchart for a process of allocating timeslots in accordance with at least one embodiment of the present invention.

FIG. 12 discloses an exemplary procedure for creating an operational schedule in accordance with at least one embodiment of the present invention. In step 1200, information may be received into at least MRC 600 regarding communication activity for at least one wireless communication medium supported by at least one radio module 610. This information may pertain to, for example, messages pending for transmission via wireless communication. In this case, the source of these messages may include other resources within WCD 100, such as an application, data input via user interaction with the device, etc. In addition to the communication activity information, power usage information may further be received by MRC 600 and/or power controller 900 in step 1202. The receipt of this information may include both information on a maximum allowed power usage threshold for all activities occurring over a specific duration of time, and the predicted power requirements for the same time period. The allowed power usage may be determined by one or more of the components previously described with respect to power controller 900, and may be some percentage of the total power available from a power source, such as a battery, in WCD 100. The predicted power requirement for a timeslot may be obtained by calculation and/or predetermined estimations for power usage when various activities are performed in WCD 100. This determination may be derived in view of both software and hardware resources that may be employed in performing an activity.

In step 1204 a determination is made as to whether there is a scheduled timeslot wherein the predicted power requirements will exceed the maximum allowed power usage for that time period. If the maximum allowed power level may be exceeded, then in step 1206 a reallocation of timeslots may be performed in order to bring the predicted power usage level below the maximum threshold value. This reallocation may further involve a prioritization of various activities that will be occurring in WCD 100 during this time period. These activities may not be limited only to active radio modules 610 that are supporting wireless communication mediums, but may also include other resources in WCD 100 not related to communication.

For example, system level activities that may occur to support the operating system of WCD 100 may be given high priority due to the critical nature of their execution. Operator interface features may fall next in the priority list so that user 110 may continue to interact with WCD 100. The priority list may continue in this manner and also include wireless communication mediums. It is important to note that if each radio module 610 only supports a single wireless communication medium, then the prioritization may be organized by radio module. However, if WCD 100 includes multimode radio modules 510 supporting a plurality of wireless communication mediums, then the prioritization may be at the wireless communication medium level. For example, GSM voice communication may be given high priority in order to preserve voice communication (e.g., telephone calls) above all other communication activities in WCD 100. Following this in priority may be another medium like Bluetooth™. Depending on the capabilities of WCD 100, the priority may be resolved down to the specific link/device level. In at least one scenario, a Bluetooth™ link to a headset may be prioritized over a link to another device, for example, a keyboard. The rational for this priority is that the headset may be utilized for a GSM telephone call, while a keyboard may be used to support less important applications.

Once the prioritization has been determined for all activities occurring in problematic timeslots, a reallocation may occur in accordance with the examples previously described with respect to FIG. 11A-11D. The reallocation may include reordering activities, changing the duration of activities, breaking larger timeslots into smaller timeslots and even canceling some activities in particularly congested timeslots. Further, a conditional timeslot allocation may also occur. For example, two or more wireless communication mediums may be assigned to share a timeslot on the condition that they do not operate simultaneously. This may occur, for example, in situations where a planned activity may not utilize the timeslot (e.g., timeslots reserved for potential Bluetooth™ SCO packets), or may only utilize a portion of a timeslot. As a result, the operational schedule may be more flexible by allowing other activities to occupy the unused timeslot, and therefore, communication may be optimized by reducing the amount of "wasted" time while maintaining power conservation. The process may then proceed to step 1208, wherein a further determination is made as to whether any potential communication conflicts exist in the operational schedule. The previous examples disclosed activities occurring in different frequencies, however, since some wireless communication mediums operate in the same frequency range (e.g., Bluetooth™ and WLAN) it is foreseeable that planned activities may cause collisions and result in communication failure. In step 1210 any communication conflicts may be resolved through further schedule adjustment as previously described.

The process of steps 1204-1210 may continue to refine the operational schedule until there are no longer any potential power concerns and communication conflicts. After a "NO" result in step 1208, the process may then proceed to step 1212, wherein the operational schedule may be distributed to the at least one radio module 610 supporting the at least one wireless communication medium. This distribution of operational schedule information may occur via common interface 620 or via dedicated MCS interface 710 if, for example, the operational schedule information is deemed to be delay-sensitive. Local control elements in radio modules 610, such as those exemplary control configurations previously described, may then utilize the operational schedule in controlling the dispatch of messages queued for wireless transmission for each wireless communication medium. The entire process may then resume in step 1200 with the reception of new information regarding communication activity in WCD 100.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

What is claimed:
1. A method, comprising:
receiving information regarding communication activity for at least one wireless communication medium supported by at least one radio module in a wireless communication device;

predicting power usage requirements based on communication-related and non-communication-related activities within the wireless communication device that are planning to use power;

determining if the predicted power usage requirements within the wireless communication device will exceed a power usage threshold of the wireless communication device;

determining if any potential communication conflicts exist regarding the communication activity;

formulating an operational schedule for the at least one wireless communication medium based on both the power usage and communication conflict determination, to prevent power usage within the wireless communication device from exceeding the power usage threshold; and transmitting the operational schedule to the at least one radio module within the wireless communication device in order to control operation of the at least one radio module in accordance with the operational schedule.

2. The method of claim 1, wherein the information regarding communication activity includes information related to messages pending for transmission via the at least one wireless communication medium, the information related to messages pending for transmission further including at least one of the amount of messages pending, the size of each message pending or the urgency of each message pending.

3. The method of claim 1, wherein the activities include the at least one of wireless communication mediums or radio modules.

4. The method of claim 1, wherein determining if the power requirements will exceed a power usage threshold includes totaling all of the power requirements of activities in the wireless communication device planned for a specific period of time.

5. The method of claim 4, wherein the total power requirements for the specific period of time are compared to an allowed power usage for the same period of time in order to determine if the allowed power usage will be exceeded.

6. The method of claim 1, wherein formulating an operational schedule for the at least one wireless communication medium based on both the power usage and communication conflict determination includes allocating at least one timeslot during which the wireless communication device is permitted to communicate using the at least one wireless communication medium.

7. The method of claim 6, wherein the at least one timeslot is assigned to the at least one wireless communication medium if the power usage threshold will not be exceeded during the timeslot.

8. The method of claim 7, wherein the at least one timeslot is assigned to the at least one wireless communication medium if no potential communication conflicts exist during the timeslot.

9. The method of claim 8, wherein the at least one timeslot is assigned to the at least one wireless communication medium based on a priority level of the at least one wireless communication medium.

10. The method of claim 6, wherein the at least one timeslot is assigned to one or more wireless communication mediums in a conditional usage configuration so that the power usage threshold will not be exceeded.

11. The method of claim 10, wherein the conditional usage configuration controls when the one or more wireless communication mediums may utilize the timeslot in view of other activities.

12. A computer program product comprising computer executable program code recorded on a computer readable non-transitory storage medium, the computer executable program code comprising:

code configured to cause a wireless communication device to receive information regarding communication activity for at least one wireless communication medium;

code configured to cause the wireless communication device to predict power usage requirements based on communication-related and non-communication-related activities within the wireless communication device that are planning to use power;

code configured to cause the wireless communication device to determine if the predicted power usage requirements within the wireless communication device will exceed a power usage threshold of the wireless communication device;

code configured to cause the wireless communication device to determine if any potential communication conflicts exist regarding the communication activity;

code configured to formulate an operational schedule for the at least one wireless communication medium based on both the power usage and communication conflict determination, to prevent power usage within the wireless communication device from exceeding the power usage threshold; and code configured to cause the wireless communication device to transmit the operational schedule to the at least one radio module within the wireless communication device in order to control operation of the at least one radio module in accordance with the operational schedule.

13. The computer program product of claim 12, wherein the information regarding communication activity includes information related to messages pending for transmission via the at least one wireless communication medium, the information related to messages pending for transmission further including at least one of the amount of messages pending, the size of each message pending or the urgency of each message pending.

14. The computer program product of claim 12, wherein the activities include the at least one of wireless communication mediums or radio modules.

15. The computer program product of claim 12, wherein determining if the power requirements will exceed a power usage threshold includes totaling all of the power requirements of activities in the wireless communication device planned for a specific period of time.

16. The computer program product of claim 15, wherein the total power requirements for the specific period of time are compared to an allowed power usage for the same period of time in order to determine if the allowed power usage will be exceeded.

17. The computer program product of claim 12, wherein formulating an operational schedule for the at least one wireless communication medium based on both the power usage and communication conflict determination includes allocating at least one timeslot during which the wireless communication device is permitted to communicate using the at least one wireless communication medium.

18. The computer program product of claim 17, wherein the at least one timeslot is assigned to the at least one wireless communication medium if the power usage threshold will not be exceeded during the timeslot.

19. The computer program product of claim 18, wherein the at least one timeslot is assigned to the at least one wireless communication medium if no potential communication conflicts exist during the timeslot.

20. The computer program product of claim 17, wherein the at least one timeslot is assigned to the at least one wireless communication medium based on a priority level of the at least one wireless communication medium.

21. The computer program product of claim 20, wherein the at least one timeslot is assigned to one or more wireless communication mediums in a conditional usage configuration so that the power usage threshold will not be exceeded.

22. The computer program product of claim 21, wherein the conditional usage configuration controls when the one or more wireless communication mediums may utilize the timeslot in view of other activities.

23. A device comprising:
at least one processor; and
at least one memory including computer program code, the at least one memory and the computer program code configured to, with the at least one processor, cause the apparatus at least to:
receive information regarding communication activity for at least one wireless communication medium supported by at least one radio module in the device;
predict power usage requirements based on communication-related and non-communication-related activities within the device that are planning to use power;
determine if the predicted power usage requirements within the wireless communication device will exceed a power usage threshold of the wireless communication device;
determine if any potential communication conflicts exist regarding the communication activity;
formulate an operational schedule for the at least one wireless communication medium based on both the power usage and communication conflict determination, to prevent power usage within the wireless communication device from exceeding the power usage threshold; and
transmit the operational schedule to the at least one radio module within the wireless communication device in order to control operation of the at least one radio module in accordance with the operational schedule.

24. The device of claim 23, wherein the device further includes a power controller.

25. The device of claim 24, wherein the power controller is integrated with a multiradio controller in the device.

26. The device of claim 24, wherein the power controller further comprises a energy management hardware component and an energy management software server.

27. The device of claim 24, wherein the power controller receives information regarding power requirements in the device and determines if the power requirements will exceed a power usage threshold during a specific time period.

28. The device of claim 23, wherein the various components in the device are coupled via a communication interface dedicated to conveying delay-sensitive information.

29. A device, comprising:
means for receiving information regarding communication activity for at least one wireless communication medium supported by at least one radio module in the device;
means for predicting power usage requirements based on communication-related and non-communication-related activities within the device that are planning to use power;
means for determining if the predicted power usage requirements within the wireless communication device will exceed a power usage threshold of the wireless communication device;
means for determining if any potential communication conflicts exist regarding the communication activity;
means for formulating an operational schedule for the at least one wireless communication medium based on both the power usage and communication conflict determination, to prevent power usage within the wireless communication device from exceeding the power usage threshold; and
means for transmitting the operational schedule to the at least one radio module within the wireless communication device in order to control operation of the at least one radio module in accordance with the operational schedule.

30. The device of claim 29, wherein the device further includes a power controller.

31. The device of claim 30, wherein the power controller is integrated with a multiradio controller in the device.

32. The device of claim 30, wherein the power controller further comprises a energy management hardware component and an energy management software server.

33. A system, comprising:
a wireless communication device, the wireless communication device further comprising at least a multiradio controller coupled to at least one radio module and a power controller;
the multiradio controller receiving information regarding communication activity for at least one wireless communication medium supported by the at least one radio module;
the power controller predicting power usage requirements based on communication-related and non-communication-related activities in the wireless communication device that are planning to use power and determining if the power requirements within the wireless communication device will exceed a power usage threshold of the wireless communication device;
the multiradio controller further determining if any potential communication conflicts exist regarding the communication activity;
at least one of the multiradio controller or the power controller formulating an operational schedule for the at least one wireless communication medium based on both the power usage and communication conflict determination, to prevent power usage within the wireless communication device from exceeding the power usage threshold; and
the multiradio controller further transmitting the operational schedule to the at least one radio module within the wireless communication device in order to control operation of the at least one radio module in accordance with the operational schedule.

34. A multiradio controller, comprising:
at least one interface coupled to one or more radio modules integrated within a wireless communication device; and
at least one interface coupled to a power management component integrated within the wireless communication device;
the multiradio controller being configured to receive radio module status information via the at least one interface to the one or more radio modules, and predicted wireless communication device power usage requirements based on activities in the wireless communication device that are planning to use power via the at least one interface to the power management component;
formulate operational schedule information for the one or more radio modules based on the received status information and received power usage requirements, to prevent power usage within the wireless communication device from exceeding the power usage threshold of the wireless communication device; and transmit the formulated operational schedule information to the one or more radio modules within the wireless communication device via the at least one interface in order to control operation of the at least one radio module in accordance with the operational schedule.

35. The method of claim 1, wherein said predicting the power usage requirements, occurs when there is a change in communication activity for the at least one wireless communication medium supported by the at least one radio module in the wireless communication device.

* * * * *